US011625180B1

(12) United States Patent
Dinkar et al.

(10) Patent No.: US 11,625,180 B1
(45) Date of Patent: Apr. 11, 2023

(54) FAULT TOLERANT RESERVATION STATE DISTRIBUTION FOR MULTI-PARTITION LOGICAL VOLUMES

(71) Applicant: Amazon Technologies, Inc., Seattle, WA (US)

(72) Inventors: Swapnil Vinay Dinkar, Seattle, WA (US); Pradeep Kunni Raman, Snohomish, WA (US); David Matthew Buches, Mercer Island, WA (US); Hon Ping Shea, Seattle, WA (US); Norbert Paul Kusters, Leavenworth, WA (US)

(73) Assignee: Amazon Technologies, Inc., Seattle, WA (US)

( * ) Notice: Subject to any disclaimer, the term of this patent is extended or adjusted under 35 U.S.C. 154(b) by 147 days.

(21) Appl. No.: 17/118,300

(22) Filed: Dec. 10, 2020

(51) Int. Cl.
*G06F 3/06* (2006.01)

(52) U.S. Cl.
CPC ............ *G06F 3/0644* (2013.01); *G06F 3/064* (2013.01); *G06F 3/0604* (2013.01); *G06F 3/0631* (2013.01); *G06F 3/0665* (2013.01); *G06F 3/0689* (2013.01)

(58) Field of Classification Search
CPC ...... G06F 3/0604; G06F 3/064; G06F 3/0644; G06F 3/0631; G06F 3/0689; G06F 3/0665

USPC ......................................................... 711/154
See application file for complete search history.

(56) References Cited

U.S. PATENT DOCUMENTS

| 2006/0075198 | A1* | 4/2006 | Susaki | G06F 3/0631 |
| | | | | 711/147 |
| 2015/0127917 | A1* | 5/2015 | Mettu | G06F 12/1475 |
| | | | | 711/163 |
| 2016/0371119 | A1* | 12/2016 | Moroski | G06F 9/5016 |
| 2019/0034837 | A1* | 1/2019 | Lou | G06N 20/00 |
| 2019/0278672 | A1* | 9/2019 | Jin | G06F 3/0617 |

* cited by examiner

*Primary Examiner* — Hua J Song
(74) *Attorney, Agent, or Firm* — Alexander A. Knapp; Kowert, Hood, Munyon, Rankin & Goetzel, P.C.

(57) ABSTRACT

A storage service supports attachment of multiple clients to a distributed storage object and further supports persistent reservations that govern types of access the respective clients are granted with respect to the distributed storage object. In order to efficiently distribute reservation state changes to multiple partitions of the distributed storage object hosted by different data storage units/servers, existing connections are used between the data storage units/servers hosting the partitions of the distributed storage object and the connected clients to propagate reservation state changes.

20 Claims, 18 Drawing Sheets

*IO Processing for Server Hosting Partition of Logical Volume*

FAULT TOLERANT RESERVATION STATE DISTRIBUTION FOR MULTI-PARTITION LOGICAL VOLUMES

BACKGROUND

Advances in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments are frequently supported by block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability.

Typically storage reservations are made between a single server and attached storage. However, such storage reservations may not function properly for block-based storage volumes comprising multiple partitions hosted by different host devices and that are attached to multiple different clients.

BRIEF DESCRIPTION OF THE DRAWINGS

FIG. 1 also illustrates a first persistent reservation state for the logical volume and a second persistent reservation state for the logical volume, wherein each partition stores a copy of the reservation state and a designated partition of the logical volume stores an authoritative version of the reservation state, according to some embodiments.

Figure 1:
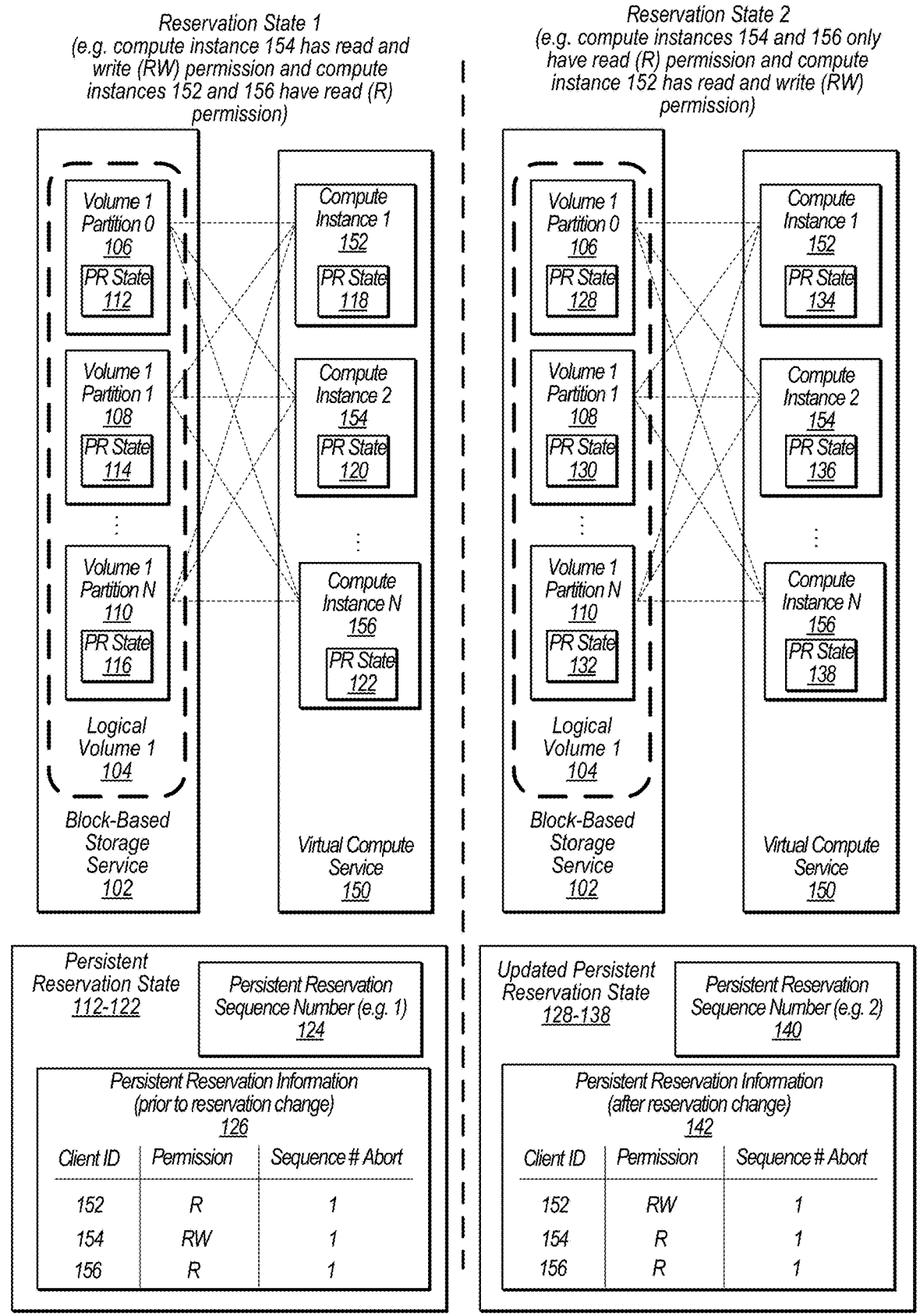
FIG. 1 illustrates a logical volume of a block-based storage service and multiple compute instances of a virtual compute service that are attached to the logical volume.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Generally described, aspects of the present disclosure related to a fault-tolerant mechanism to distribute a shared state between "N" clients and "M" servers that are connected via existing connections. A designated one of the servers stores an authoritative copy of a shared state and the connected clients distribute a current copy of the shared state received from the designated server to other ones of the servers. The existing connections between the clients and servers are used by the clients to distribute the current shared state. Also, the clients poll the designated server using the existing connections to obtain the current shared state, which the clients then broadcast to the remaining servers. In some embodiments, a client polls the designated server according to a polling schedule and broadcasts an updated shared state in response to a poll response from the designated server indicting a sequence number for a current shared state that is greater than a sequence number associated with a shared state currently stored by the client performing the poll. In some embodiments, a client may perform an unscheduled poll of the designated server in response to receiving an indication that the sequence number associated with the shared state currently stored by the client has been superseded.

Generally described, additional aspects of the present disclosure relate to providing reservation support for logical volumes implemented using partitions distributed over multiple different data storage units, wherein multiple client computing devices or client computing instances are attached to the logical volume. Because a logical volume may be implemented using multiple different data storage units, there is a need for a mechanism to distribute reservation state changes to each of the data storage units, such that a block-based data storage service maintains a consistent view of the reservation state for the logical volume. Additionally, the techniques described herein make use of existing connections between the data storage units hosting the partitions of the logical volume and the attached compute instances to distribute a change in reservation state without requiring additional connections to be formed either between the data storage units hosting the partitions or between the computing device/computing instance clients. This approach provides low overhead costs and latencies for distributing new reservation states for a logical volume implemented using multiple partitions hosted by different computing devices.

While various examples are described herein in terms of data storage units hosting partitions of a logical volume and computing instances attached to the logical volume, the fault tolerant state distribution techniques described herein could also be used to maintain a shared state and fault tolerantly distribute the shared state using existing connections between other types of devices such as first group of nodes that are connected to a second group of nodes, wherein the first and second sets of nodes may include a set of servers connected to a set of clients, a set of processors connected to a set of auxiliary processors, such as graphics processing units (GPUs), application specific integrated circuits (ASICs), etc.

For example, using the techniques described herein, there is no need for the data storage units hosting the partitions to establish connections between one another to distribute a reservation update. Instead, existing connections to attached compute instances are used to distribute a reservation update between data storage units hosting different partitions of a logical volume. Also, there is no need for the compute instances attached to the logical volume to establish connections between one another to distribute a reservation state, because the distribution is done using existing connections between the respective compute instances and data storage units hosting partitions of the logical volume for which the reservation state is being updated.

In general, a virtualized block storage volume (referred to in various implementations as a cloud disk, storage disk, cloud volume, disk, block volume, or simple "volume") can correspond to a logical collection of data, such as a set of data maintained on behalf of a user. The data of the volume may be erasure coded and/or replicated between multiple devices within a distributed computing system, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas.

The client represents instructions that enable a compute instance to connect to, and perform I/O operations at, a remote data volume (e.g., a data volume stored on a physically separate computing device accessed over a network).

The client may be implemented on an offload card of a server that includes the processing units (e.g., CPUs or GPUs) of the compute instance. In some implementations, at least a subset of virtualization management tasks may be performed at one or more offload cards so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like.

In some embodiments, the fault-tolerant reservation update technique as described herein may be used by a block-based storage service to support creating and updating reservations that comply with non-volatile memory express (NVMe) standardized reservation commands, small computer system interface (SCSI) storage reservation commands, or other standardized reservation commands. For example, an application executing on a compute instance connected to a logical volume may issue a reservation command according to a standardized NVMe command format. In such a situation, the compute instance may then generate a reservation update request to send to a designated partition (e.g. partition P0) of a logical volume attached to the compute instance, wherein the reservation update request initiates a change in reservation state for the logical volume. In turn, the designated partition receiving the reservation update request (e.g. P0) may store a new reservation state for the logical volume that reflects the requested reservation change and that includes a reservation sequence number that has been incremented due to the change in reservation state. The partition P0 of the logical volume attached to the compute instance may provide the new reservation state that includes the incremented sequence number to the compute instance that requested the reservation update. In response to receiving the reply from the designated partition (e.g. P0) indicating the new reservation state (with incremented sequence number), the compute instance may then broadcast the new reservation state (with incremented sequence number) to remaining ones of the data storage units hosting other ones of the partitions of the logical volume attached to the compute instance. If the new reservation state (with the incremented sequence number) has a sequence number that is greater than a reservation state currently stored for remaining partitions of the logical volume, the data storage units hosting the remaining partitions will store the new reservation state (with the incremented sequence number) as the current reservation state for the logical volume that is to be applied for IO operations directed at the respective partition of the logical volume hosted by the respective data storage unit.

Additionally, the compute instances attached to the logical volume may include a current sequence number with IO requests directed to the partitions of the attached logical volume, and the data storage units hosting the partitions may include a current sequence number with IO responses directed back at the compute instances. In this way, if a compute instance becomes stale (e.g. does not store the most up to date reservation state with the latest sequence number), the compute instance will be made aware of this fact based on an IO response from a data storage unit hosting a partition with a larger sequence number for its current reservation state. In such situations the compute instance will poll the data storage unit hosting the designated partition of the logical volume that maintains the authoritative reservation state (e.g. P0) to learn the current authoritative reservation state for the logical volume. If the current reservation state has a sequence number greater than the sequence number stored currently stored by the compute instance, the compute instance will then update its stored reservation state to match the current reservation state received from P0 (with the larger sequence number) and broadcast the current reservation state received from P0 as a result of the poll to the data storage units hosting the other partitions of the logical volume.

Additionally, the compute instances attached to the logical volume may perform a scheduled poll of the partition P0 of the logical volume in addition to polling P0 in response to an IO response indicating a larger sequence number than the sequence number stored by the respective compute instances. These polling mechanisms provide fault tolerance. For example, if the compute instance that initiated the reservation change falls offline before broadcasting the new reservation state to the data storage units hosting the remaining partitions, the remaining compute instances attached to the logical volume would nevertheless broadcast the new reservation state, either in response to an IO response from the data storage unit hosting partition P0 indicating a new sequence number larger than a currently stored sequence number, or in response to a scheduled poll causing one of the remaining compute instances to receive a poll response with a larger sequence number than a sequence number of a currently stored reservation state.

In some embodiments, reservations for a multi-partition logical volume may further support additional features, such as a computing instance access abort feature and/or a split IO feature. In some embodiments, a reservation abort flag may be set for a given compute instance indicating a sequence number for which a reservation access privilege for the given compute instance is to be aborted. For example, an abort flag of a reservation state may indicate that compute instance X is to have its reservation aborted at sequence number Y. In such a situation, a data storage unit hosting a partition storing such a reservation state may abort IOs from compute instance X when the current sequence number stored for the partition is greater than sequence number Y. In some embodiments, a data storage unit hosing a partition may drain IOs that are in flight for the partition prior to committing a reservation state change that includes an abort flag change. For example, a data storage unit hosting partition Z may guarantee that no IOs will be processed for compute instance X, subsequent to storing the new reservation state that indicates a reservation abort for compute instance X for sequence numbers greater than Y. Because the data storage unit hosting the partition drains in flight IOs prior to committing the new reservation state, the data storage unit can guarantee that no IOs from compute instance X were processed after storing the new reservation state that includes a sequence number greater than Y.

In some embodiments, an IO request issued from a compute instance to a logical volume may span more than one partition hosted by more than one data storage unit. In such circumstances, a split IO flag may be set such that if at least one of the data storage units hosting at least one of the impacted partitions stores a reservation state indicating that the requesting compute instance is authorized to perform the IO spanning multiple partitions, then the other data storage units hosting other ones of the partitions impacted by the split IO will let the IO go forward.

In the techniques described herein, it is the responsibility of the compute instances attached to the logical volume to distribute the latest reservation state. For example, by polling partition P0 and broadcasting any new reservation states to the remaining partitions. Also, it is the responsibility of data storage units hosting the partitions to fence out compute instances for which a current reservation state does not grant a particular type of access.

Once each partition has stored a reservation update and a compute instance attached to the logical volume has received acknowledgments from each of the data storage units hosting the partitions of the logical volume indicating that the updated reservation state has been stored, the new reservation state may be considered established for the logical volume and a reply may be sent to a requesting application executing on the compute instance indicating that the new reservation state for the logical volume has been persisted.

In some embodiments, a partition of a logical volume may be stored on a data storage unit comprising a plurality of head nodes and data storage sleds. Data may be initially stored in a storage of a head node and replicated to a storage of one, two, or more other head nodes, and may be asynchronously copied to multiple mass storage devices in different data storage sleds that form a RAID array (random array of independent disks) to store the data. In some embodiments, recently stored data or frequently accessed data may remain in a head node storage to allow for low latency access to the data. The data may then be copied to mass storage devices in data storage sleds of a data storage unit after a certain amount of time has elapsed since the data was last accessed or stored. Relocating the data to the mass storage devices may maintain or increase a durability of the data as compared to the data being stored in a storage of a primary head node and being replicated to a storage of one, two, or more secondary/reserve head nodes. In some embodiments, other criteria may be used to determine when data stored in a storage of a head node is to be moved to mass storage devices of data storage sleds of a data storage unit. For example, data may be collected in a log of a head node and upon an amount of data being stored in the log exceeding a threshold amount, the data may be relocated to mass storage devices of data storage sleds of a data storage unit of the fault-tolerant data storage system.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In order to facilitate a failover operation between a primary head node and a reserve head node of a set of reserve head nodes, a control plane may issue new credentials to a set of head nodes that includes a reserve head node assuming a role of primary head node for a volume or volume partition. Additionally, once a replacement reserve head node has been designated for the volume partition, the control plane may issue another new credential. In some embodiments, each time a membership change occurs for a set of head nodes that implement a primary head node and a set of two or more reserve head nodes for a volume partition, a control plane may issue a new credential to the head nodes included in the set with the changed membership. In some embodiments, the newly issued credential may be used to perform a failover and to ensure writes replicated between the head nodes and written to the data storage sleds are the most current writes for the volume partition. For example, a newly assigned primary head node may present the credentials to respective sled controllers to receive respective tokens that supersede tokens previously issued to a previous head node acting as a primary head node for a particular volume or volume partition that had data stored in portions of mass storage devices service by the sled controller. Thus, during a fail over event, a previous primary head node may be fenced off from portions of mass storage devices to prevent corruption of data stored on the mass storage devices during the failover event.

FIG. 1 illustrates a logical volume of a block-based storage service and multiple compute instances of a virtual compute service that are attached to the logical volume. FIG. 1 also illustrates a first persistent reservation state for the logical volume and a second persistent reservation state for the logical volume, wherein each partition stores a copy of the reservation state and a designated partition of the logical volume stores an authoritative version of the reservation state, according to some embodiments.

Figure 3:
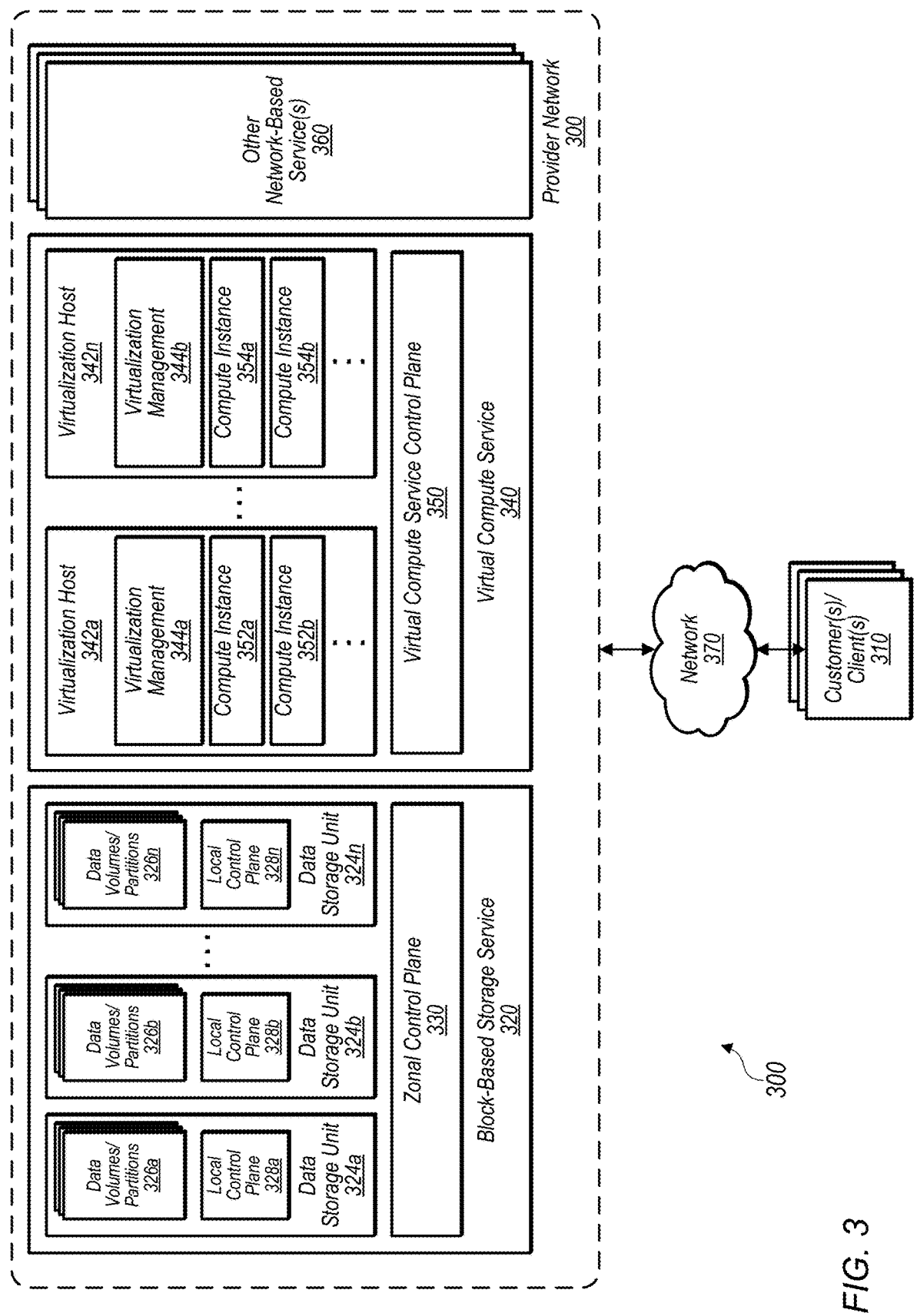
FIG. 3 is a block diagram illustrating a provider network implementing multiple network-based services including a block-based storage service and a virtual compute service, wherein the block-based storage service supports multiple attachments to a given logical volume and persistent reservations for the logical volume, according to some embodiments.

Block-based storage service 102 (referred to in various implementations as a cloud disks service, a managed disk service, a cloud block storage service, a persistent disk service, or a block volumes service) may be a block-based storage service of a cloud service provider network. For example, block-based storage service 102 may be a block-based storage service similar to block-based storage service 320 included in provider network 300, as illustrated in FIG. 3. Virtual compute service 150 (referred to in various implementations as an elastic compute service, a virtual machines service, a computing cloud service, a compute engine, or a cloud compute service) may be a virtual compute service of a cloud service provider network. Also, compute service 150 may be a virtual compute service similar to virtual compute service 340 that is also included in provider network 300, as illustrated in FIG. 3.

Block-based storage service 102 hosts logical volume 1 (104) that is partitioned into a plurality of partitions, such as partition P0 (106), partition P1 (108), up to partition PN (110), wherein N may be any number. For example, in some embodiments, a logical volume may include up to 16 partitions, such that N=15. Each of the partitions 106 through 110 may be stored in a different data storage unit or set of data storage units. In some embodiments, each partition is stored in a data storage unit comprising a plurality of head nodes and data storage sleds, wherein each volume partition is assigned a primary head node, a secondary head node, and space on the data storage sleds to store volume partition data that has been flushed from the head nodes. In some embodiments, other data storage unit configurations may be used to store a volume partition. For example, in some embodiments, a partition may be stored using a primary data storage unit and a secondary data storage unit, wherein the primary data storage unit and the secondary data storage unit are located in different fault domains, such as different data centers or regions of a provider network.

Virtual compute service 150 includes compute instances 152, 154, and 156, which may be similar to the compute instances as described in more detail in FIG. 3, such as compute instances 352 and 354. Virtual compute service 150 may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

As illustrated in FIG. 1, a volume partition can be attached to one or more compute instances. Attachment between a volume and an instance refers to the establishment of a connection between a client of the instance and the volume. This connection may be referred to as a "lease" in some implementations, and it enables the instance to view the volume as if it were a local storage drive, even though the volume and instance may be hosted on different physical machines and communicating over a network. As described above, the client represents instructions that enable a compute instance to connect to, and perform I/O operations at, a remote data volume, and may be implemented on an offload card.

As can be seen in FIG. 1, each of the volume partitions (106 through 110) of logical volume 1 (104) and each of the compute instances (152 through 156) attached to logical volume 1 (104) store a persistent reservation state (PR state) for the logical volume. For example, the designated partition, which acts as the authoritative store for reservation state data, is partition P0 (106) and it stores persistent reservation state (PR state) 112. Additionally, partition P1 (108) stores persistent reservation state (PR state) 114, which is a PR state that has been distributed to partition P1 (108) by one of the compute instances 152-156 attached to the logical volume 104 that acquired the PR state 112 from partition P0 (106). Once a reservation state change is persisted for logical volume 1 (104) each of the persistent reservations stored by the respective partitions will be the same. For example, in FIG. 1 at reservation state 1, partitions 106 through 110 store a same persistent reservation state that has associated persistent reservation sequence number 1 (124). For example, FIG. 1 illustrates persistent reservation information 126 corresponding to the persistent reservation state 1 associated with persistent reservation sequence number 1 (124), wherein compute instances 152 and 156 have read privileges and compute instance 154 has read and write privileges for logical volume 1 (104). Also persistent reservation information 126 indicates that a preempt and abort is set for each of compute instances 152, 154, and 156 at sequence number 1. This means that when the sequence number 1 is exceeded any previous reservation privileges for these compute instances are pre-empted and aborted.

Also, each of compute instances 152-156 store a persistent reservation state (PR state), such as PR states 118-122. When a reservation change is finished being distributed, the PR states stored by the compute instances and the PR states stored by the volume partitions will be the same. However, during a change in PR states, some of the partitions (e.g. partition P1 (108) or partition PN (110) may not have yet received an updated PR state and some of the compute instances may not have yet received an updated PR state to distribute.

In some embodiments, compute instances attached to a logical volume, such as compute instances 152-156 attached to logical volume 1 (104) may include a sequence number associated with the PR state stored by the respective compute instances in IO commands directed at the partitions of the logical volume. Likewise, data storage units hosting partitions of a logical volume 1, such as data storage units hosting partitions P0 (106), P1 (108), and PN (110), may include a sequence number of the PR state currently stored by the respective partition in a response sent back to the respective compute instances in response to an IO command. In this way, when one partition (e.g. partition P0 (106)) stores an updated reservation, any compute instance interacting with the partition will be made aware of the change in reservation state. Likewise any partitions interacting with a compute instance that has stored a new sequence number will be made aware of the change in reservation state.

Additionally, each of the compute instances attached to a logical volume, such as compute instances 152, 154, or 156 attached to logical volume 1 (104), may poll partition P0 (106) for a latest reservation state and associated sequence number. In response to receiving a new/updated reservation state, the compute instances 152 through 156 will broadcast the new/updated reservation state and associated reservation sequence number to the remaining partitions, such as partition P1 (108) and partition PN (116).

For example, the right side of FIG. 1 shows a second reservation state for logical volume 1 (104) after a new reservation state (e.g. reservation states 128-138) with sequence number 2 (140) has been propagated to each of partitions P0 (106), P1 (108), and PN (110). For example, partition P0 (106) stores updated PR state 128, partition P1

(108) stores updated PR state 130, partition PN (110) stores updated PR state 132. Likewise compute instance 152 stores updated PR state 134, compute instance 154 stores updated PR state 136, and compute instance 156 stores updated PR state 138. As an example, updated PR states 128-138 with associated PR sequence number 2 (140) may reflect a change in reservation information, as shown for reservation information 142, wherein compute instance 152 is granted read and write privileges for logical volume 1 (104) and compute instances 154 and 156 are granted only read privileges. Also, PR information 142 indicates a preempt and abort for compute instance 154 for sequence number 1. Thus, the former write privileges for compute instance 154 at sequence number 1 may be preempted and aborted when logical volume 1 (104) is transitioned to the updated PR state corresponding to sequence number 2.

FIGS. 2A through 2H provide further details regarding how PR state updates are propagated between partitions of logical volume 1 (104) and the attached compute instances 152-156.

Figure 2A:
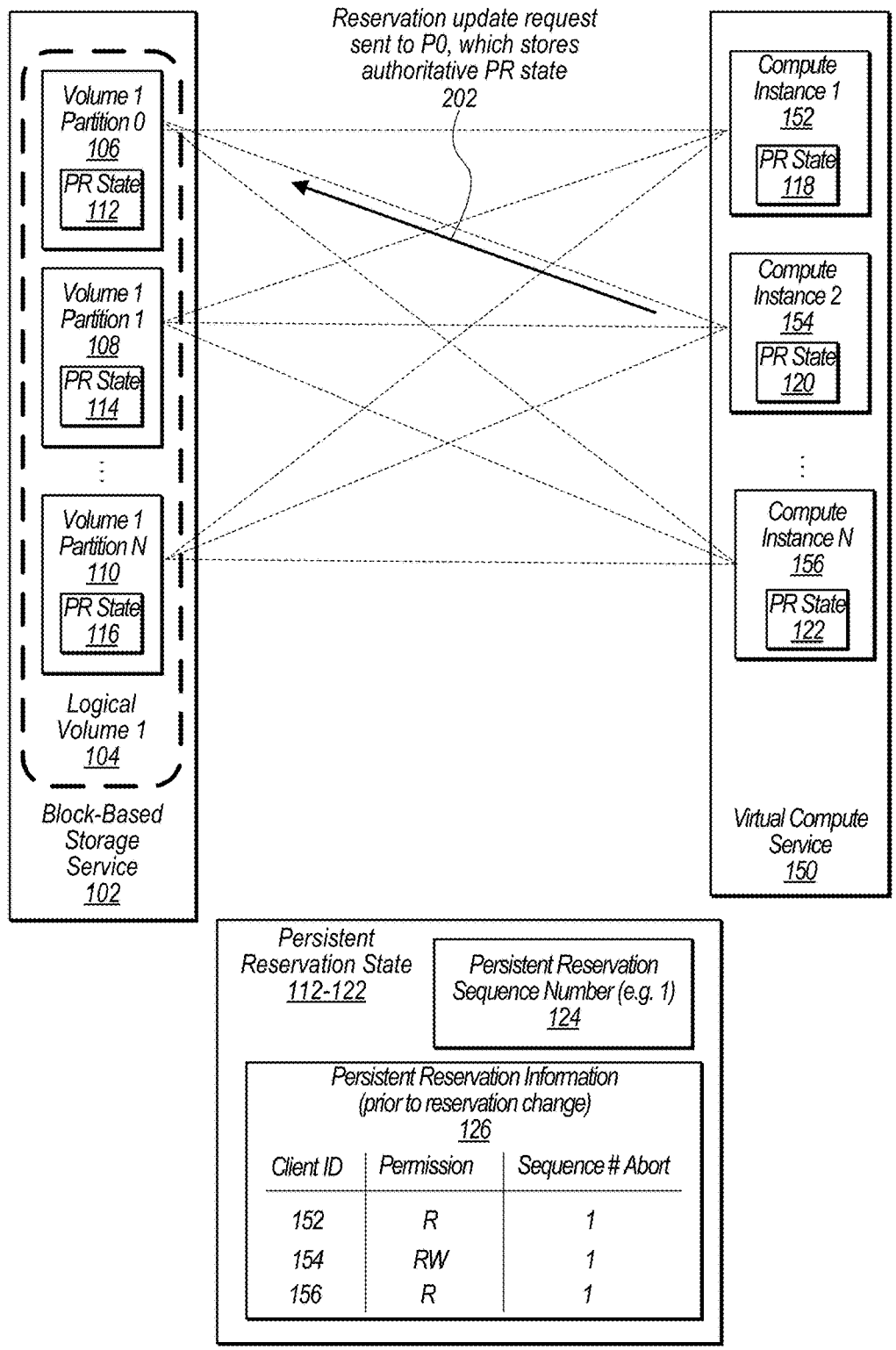
FIG. 2A illustrates a compute instance attached to a logical volume of a block-based storage service pushing a reservation update/request to a designated partition of the logical volume, wherein the designated partition stores an authoritative reservation state for the logical volume, according to some embodiments.

FIG. 2A illustrates a compute instance attached to a logical volume of a block-based storage service pushing a reservation update/request to a designated partition of the logical volume, wherein the designated partition stores an authoritative reservation state for the logical volume, according to some embodiments.

For example, at reservation state 1 as shown in FIG. 2A each of the partitions P0 through PN (106-110) of logical volume 1 (104) store a consistent PR state with sequence number 1 (e.g. PR states 112, 114, and 116 each comprising PR information 126 and PR sequence number 124).

As an example, an application executing on compute instance 154 may issue a reservation update command, such as an NVMe reservation command, or SCSI reservation command to compute instance 154. In turn compute instance 154 sends reservation update request 202 to partition P0 (106) of logical volume 1 (104). Note that partition P0 (106) is the only partition of logical volume 1 (104) that is designated to accept reservation updates/changes. Thus partition P0 (106) maintains an authoritative reservation state for logical volume 1 (104). In some embodiments, compute instance 154 may direct the reservation update request 202 to partition P0 (106) and in other embodiments, compute instance 154 may generally direct the reservation update request 202 to logical volume 1 (104) and block-based storage service 102 may route the reservation update request 202 to partition P0 (106).

Figure 2B:
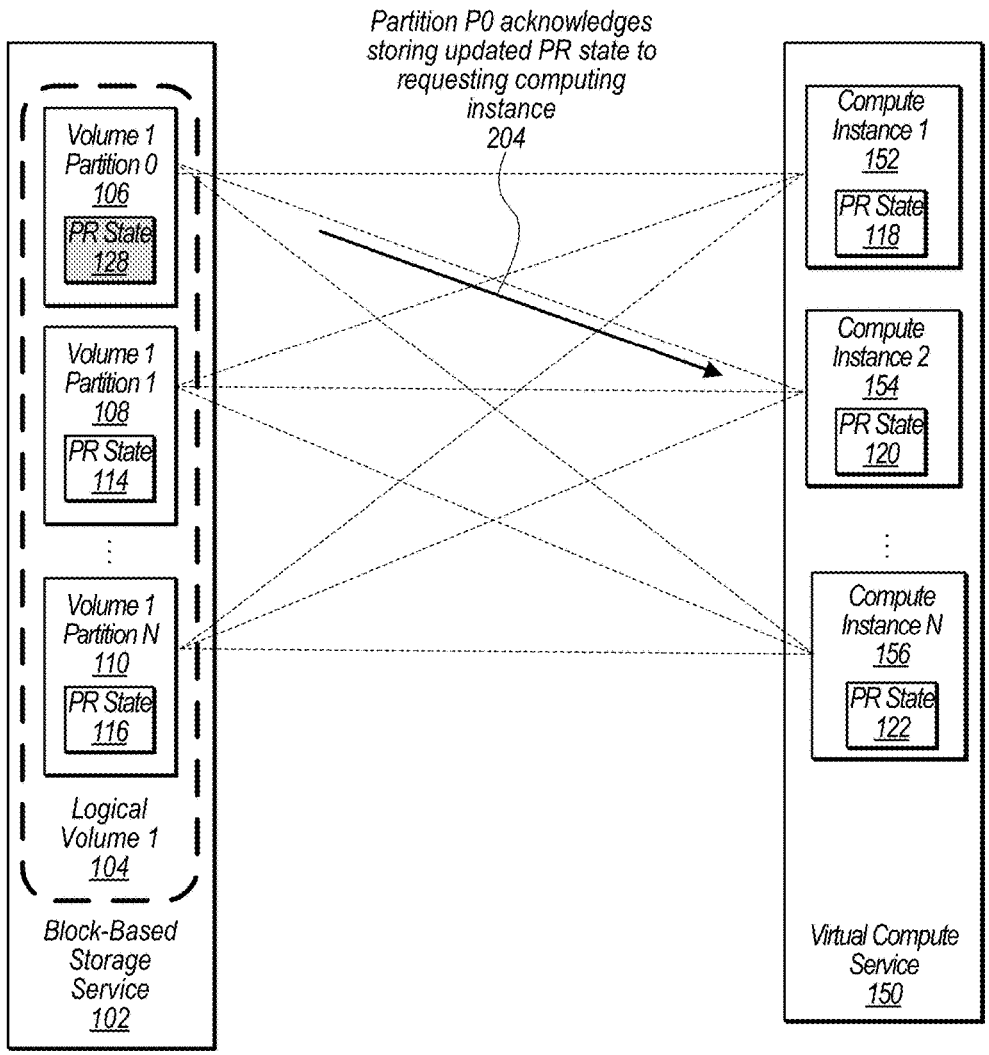
FIG. 2B illustrates the designated partition of the logical volume responding to the reservation update/request by acknowledging to the requesting compute instance that the reservation update/request has been persisted at the designated partition, according to some embodiments.

FIG. 2B illustrates the designated partition of the logical volume responding to the reservation update/request by acknowledging to the requesting compute instance that the reservation update/request has been persisted at the designated partition, according to some embodiments.

In response to receiving the reservation update request 202 from compute instance 154, the data storage unit hosting partition P0 (106) stores an updated reservation state 128 that includes updated PR information 142 and an updated sequence number 2 (140). In some embodiments, a sequence number for a reservation state may be incremented by 1 for each change in reservation state.

Additionally, the data storage unit hosting partition P0 (106) sends response 204 acknowledging that the requested reservation update has been stored in partition P0 (106).

Figure 2C:
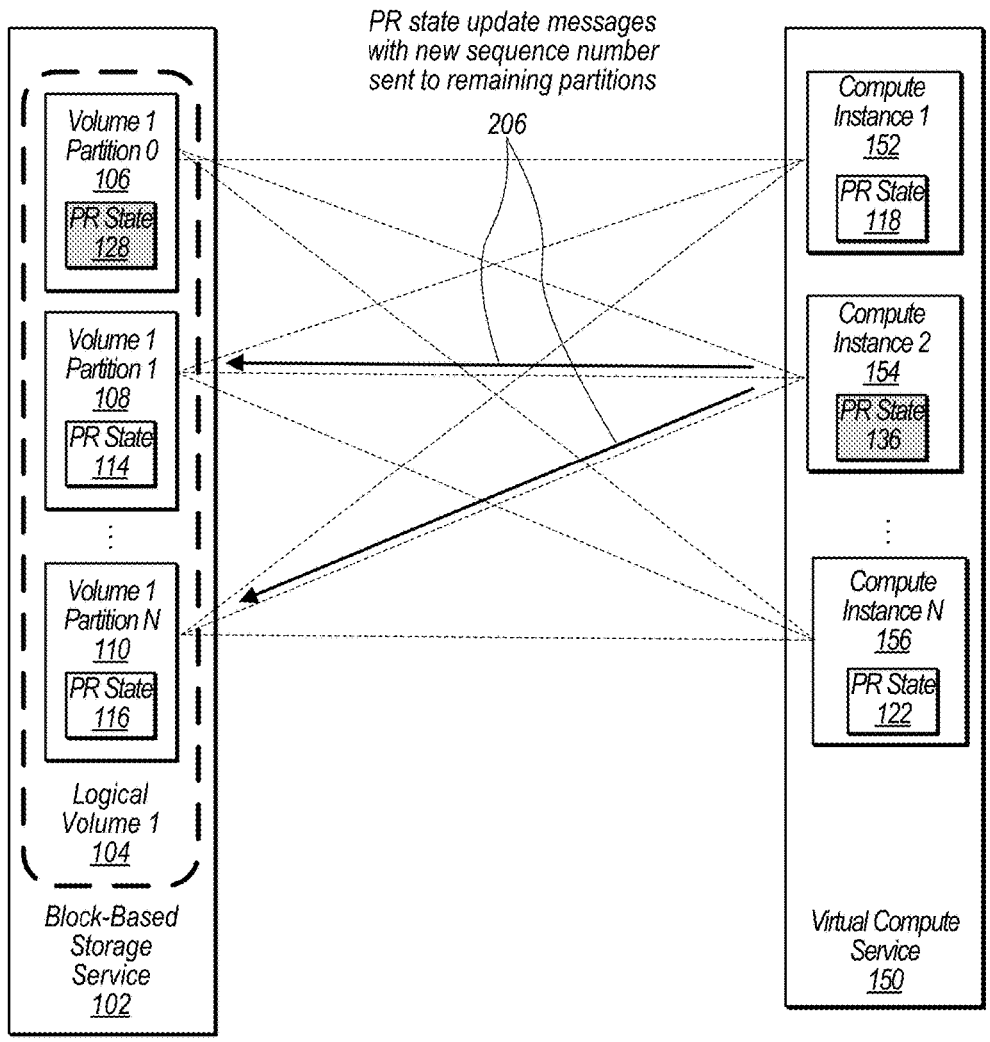
FIG. 2C illustrates the compute instance that received the acknowledgment from the designated partition broadcasting an updated reservation state for the logical volume to the other partitions of the logical volume of the block-based storage service, according to some embodiments.

FIG. 2C illustrates the compute instance that received the acknowledgment from the designated partition broadcasting an updated reservation state for the logical volume to the other partitions of the logical volume of the block-based storage service, according to some embodiments.

In response to receiving the response 204 indicating that the reservation update request 202 has been stored at partition P0 (106), compute instance 154 updates its stored PR state to PR state 136, which comprises PR information 142 and PR sequence number 2 (140). Additionally, compute instance 154 broadcasts messages 206 comprising the new PR state comprising PR information 142 and PR sequence number 2 (140) to the remaining partitions P1 (108) and PN (110) of logical volume 1 (104).

Figure 2D:
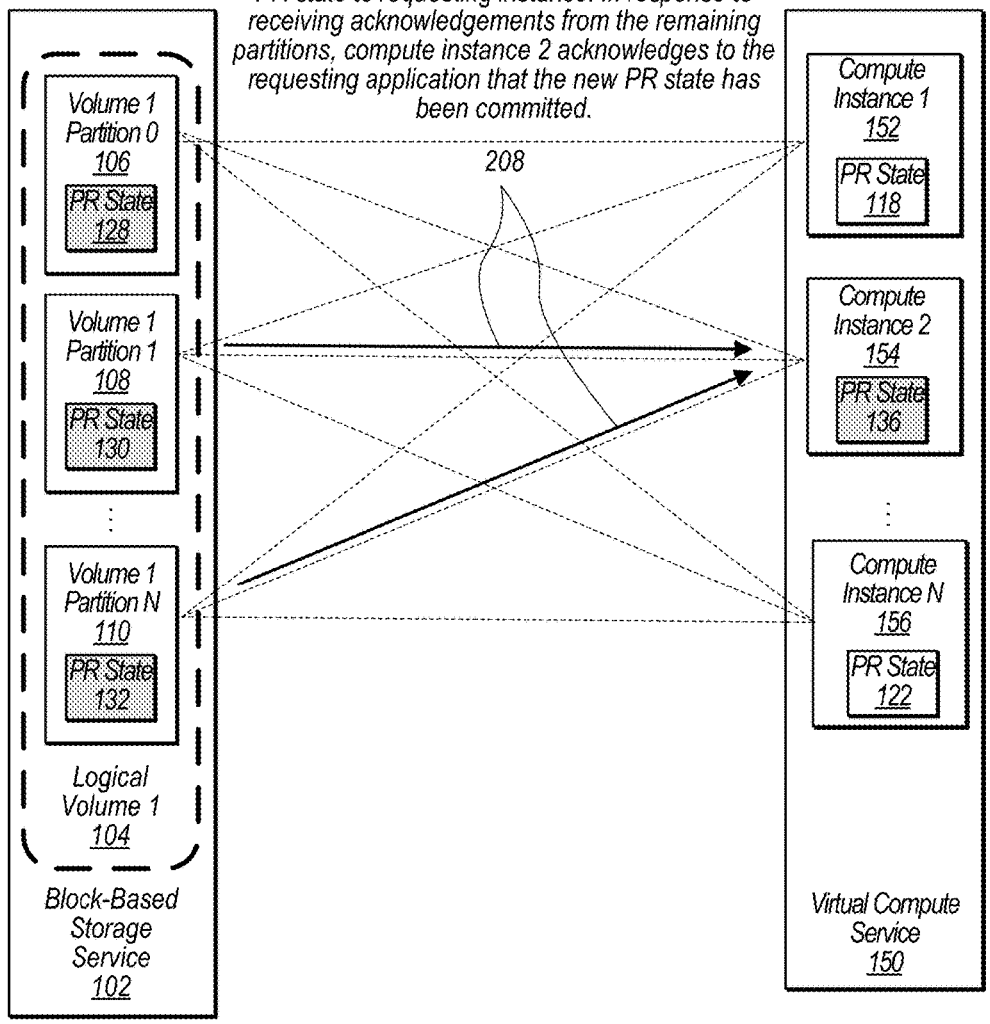
FIG. 2D illustrates the other partitions of the logical volume persisting the updated reservation state for the logical volume and sending acknowledgements to the compute instance that broadcasted the updated reservation state to the other partitions of the logical volume, according to some embodiments.

FIG. 2D illustrates the other partitions of the logical volume persisting the updated reservation state for the logical volume and sending acknowledgements to the compute instance that broadcasted the updated reservation state to the other partitions of the logical volume, according to some embodiments.

In response to receiving the updated PR states from compute instance 2 with a sequence number greater than a currently stored sequence number for a currently stored PR state, partitions P1 (108) and PN (110) store updated PR states 130 and 132, respectively, that include PR information 142 and PR sequence number 2 (140). Partitions P1 (108) and PN (110) then send acknowledgments 208 back to compute instance 154 indicating that the updated PR state corresponding to PR sequence number 2 (140) has been stored for partitions P1 (108) and PN (110).

Note that at this point all of the partitions P0 (106) through PN (110) of logical volume 1 (104) have transitioned to the updated reservation state corresponding to PR sequence number 2 (140) and have acknowledged this transition back to compute instance 154. Thus, in response to receiving the last acknowledgment from the partitions of logical volume 1 (104), compute instance 154, may indicate to the requesting application executing at compute instance 154 that the requested reservation state change/update has been committed for logical volume 1 (104).

Figure 2E:
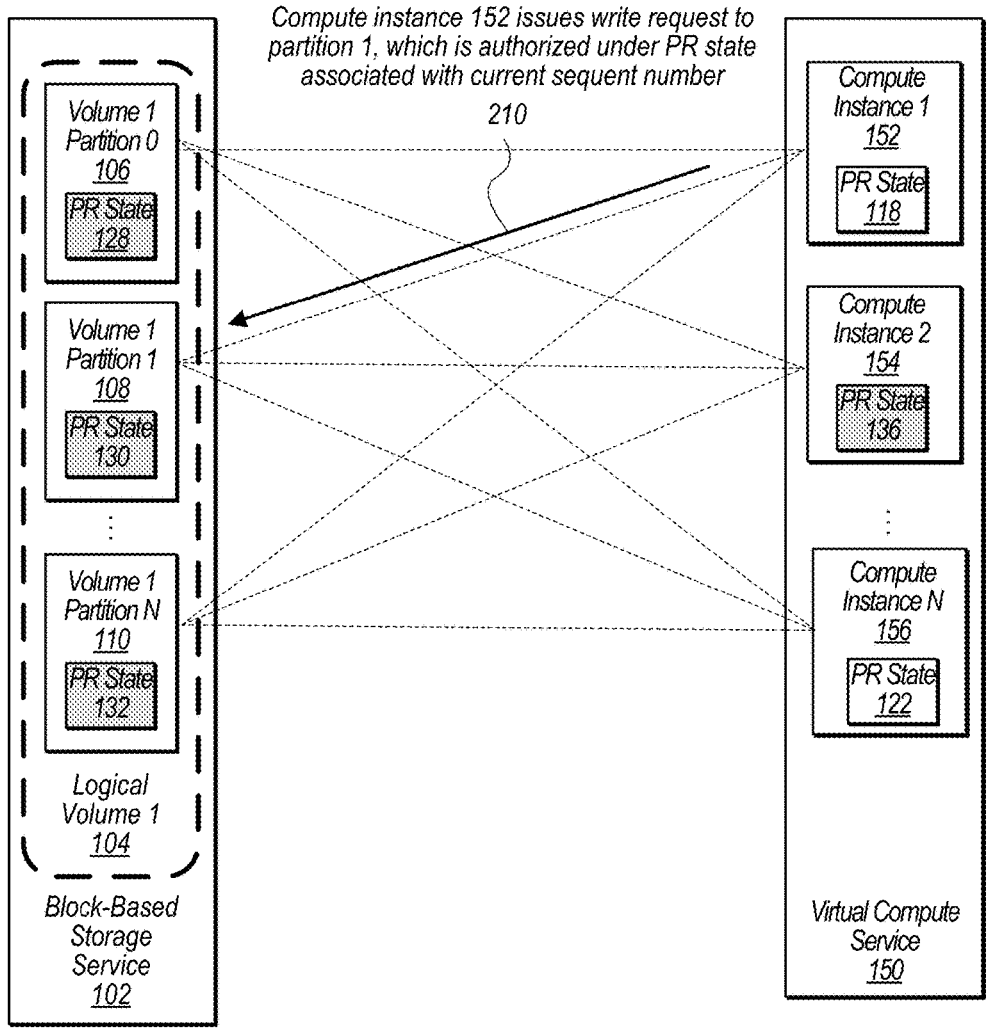
FIG. 2E illustrates a compute instance connected to the logical volume that has not yet received the updated reservation state making a read or write request to a partition of the logical volume that has persisted the updated reservation state, wherein the access privileges of the updated reservation state are used to allow or deny the requested read or write despite the request being sent with a now superseded reservation sequence number, according to some embodiments.

FIG. 2E illustrates a compute instance connected to the logical volume that has not yet received the updated reservation state making a read or write request to a partition of the logical volume that has persisted the updated reservation state, wherein the access privileges of the updated reservation state are used to allow or deny the requested read or write despite the request being sent with a now superseded reservation sequence number, according to some embodiments.

Compute instance 152 may send an IO request to a data storage unit hosting a partition of logical volume 1 (104), wherein the IO request includes a PR sequence number that has been superseded by the PR sequence number of the current PR state stored by the data storage unit for the partition of the logical volume. For example, IO request 210 may be sent with PR sequence number 1, which is associated with PR state 118 which includes PR information 126 and PR sequence number 1 (124). However, partition P1 (108) stores PR state 130 which comprises PR information 142 and PR sequence number 2 (140). In such a circumstance, the data storage unit hosting partition P1 (108) will apply the access privileges of PR state 130 which include PR information 142 when determining whether to permit or reject the IO request. Because PR information 142 allows compute instance 152 read and write privileges, the data storage unit hosting partition P1 (108) will let the IO request be processed. For example, if the IO request comprises a write request, the data storage unit hosting partition P1 (108) will perform the write because the currently stored reservation state 130 includes PR information 142 allowing compute instance 152 write access. Note that write access is allowed even though the PR sequence number 1 was sent with the write request which corresponded to superseded PR state 118 which included PR information 126 which only granted compute instance 152 read access.

Figure 2F:
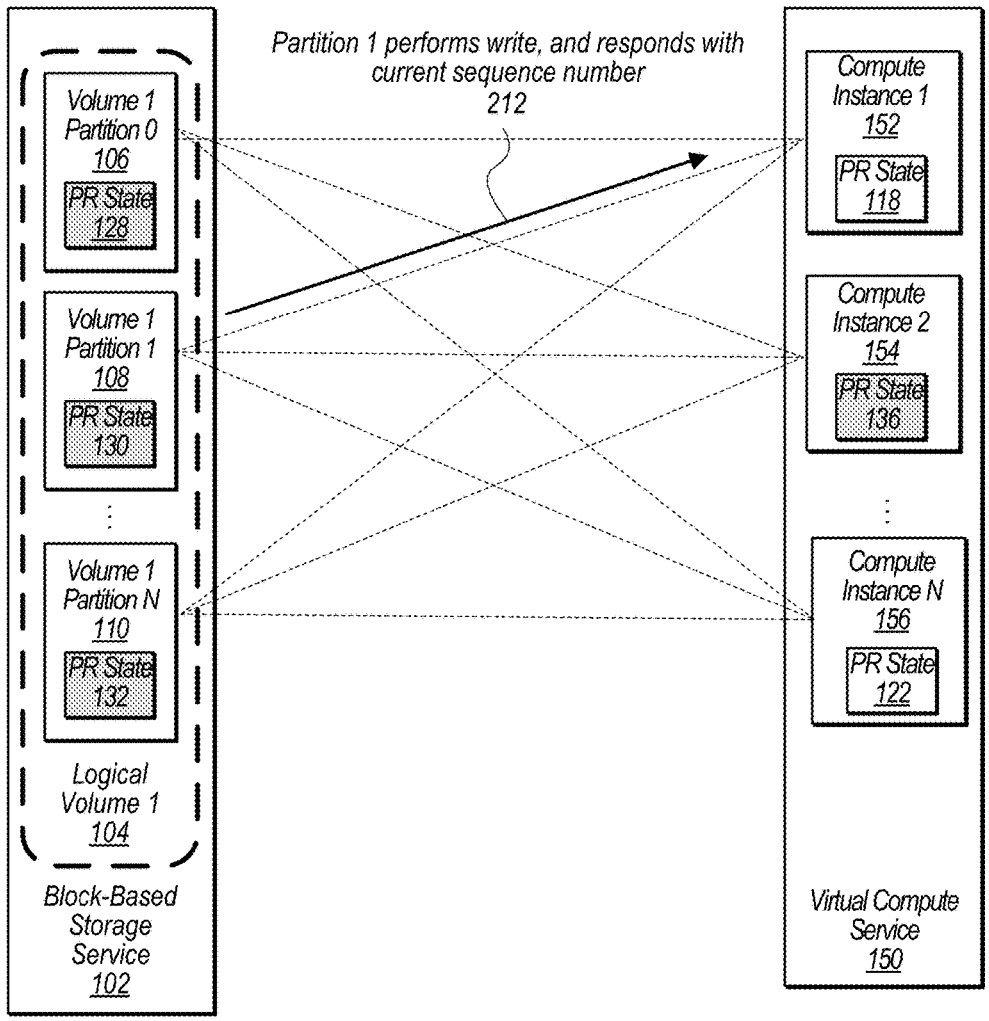
FIG. 2F illustrates the partition of the logical volume that received the read or write request responding to the request with a current sequence number for the updated reservation state of the logical volume, according to some embodiments.

FIG. 2F illustrates the partition of the logical volume that received the read or write request responding to the request with a current sequence number for the updated reservation state of the logical volume, according to some embodiments.

As discussed above, the data storage unit hosting partition P1 (108) performs the requested IO operation 210 and sends acknowledgment 212 which includes the current sequence number stored for partition P1 (108), e.g. sequence number 2.

Figure 2G:
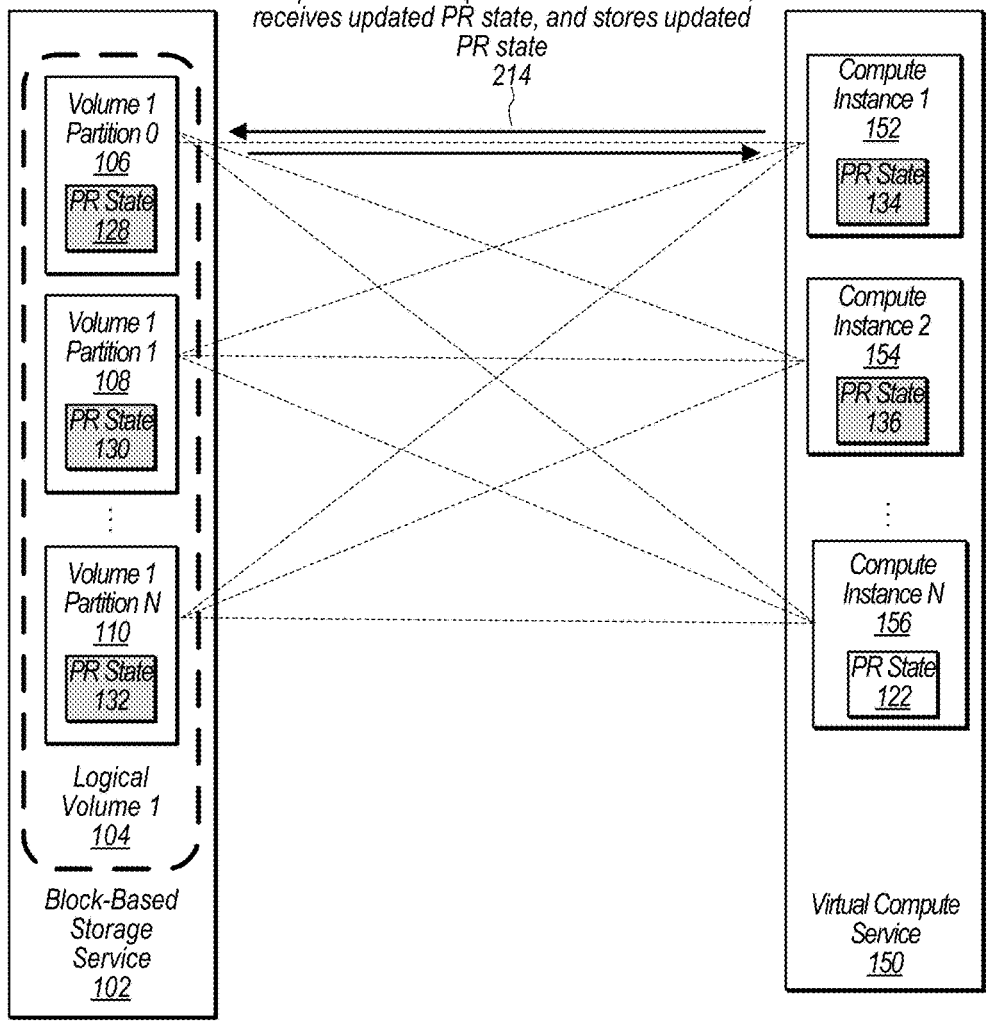
FIG. 2G illustrates another compute instance attached to the logical volume of the block-based storage service that has not yet received the updated reservation state polling the designated partition and receiving the updated reservation state for the logical volume from the designated partition, according to some embodiments.
Figure 2G:
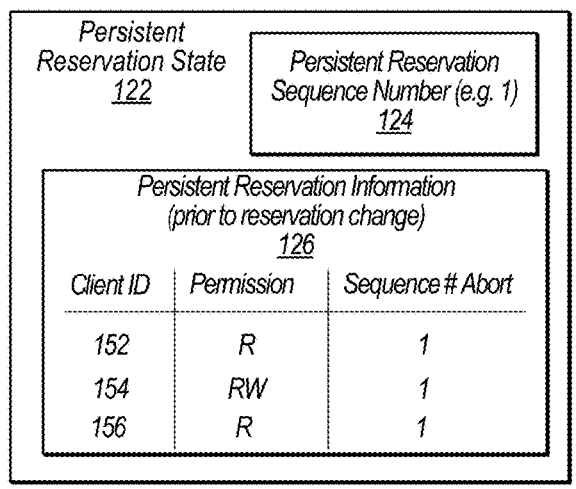
Figure 2G:
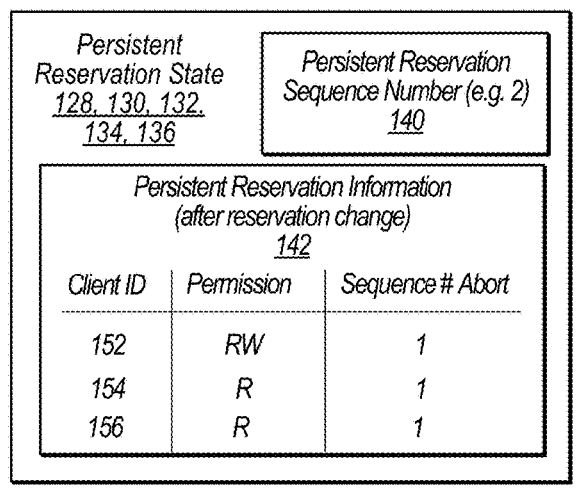

FIG. 2G illustrates another compute instance attached to the logical volume of the block-based storage service that has not yet received the updated reservation state polling the designated partition and receiving the updated reservation state for the logical volume from the designated partition, according to some embodiments.

In response to receiving the acknowledgment 212 with a sequence number greater than the sequence number of the PR state 118 stored by compute instance 152, compute instance 152 initiates a poll 214 of partition P0 (106) and receives the updated reservation state comprising PR information 142 and sequence number 2 (140). Compute instance 152 updates its stored PR state to PR state 134 which includes PR information 142 and PR sequence number 2 (140).

Figure 2H:
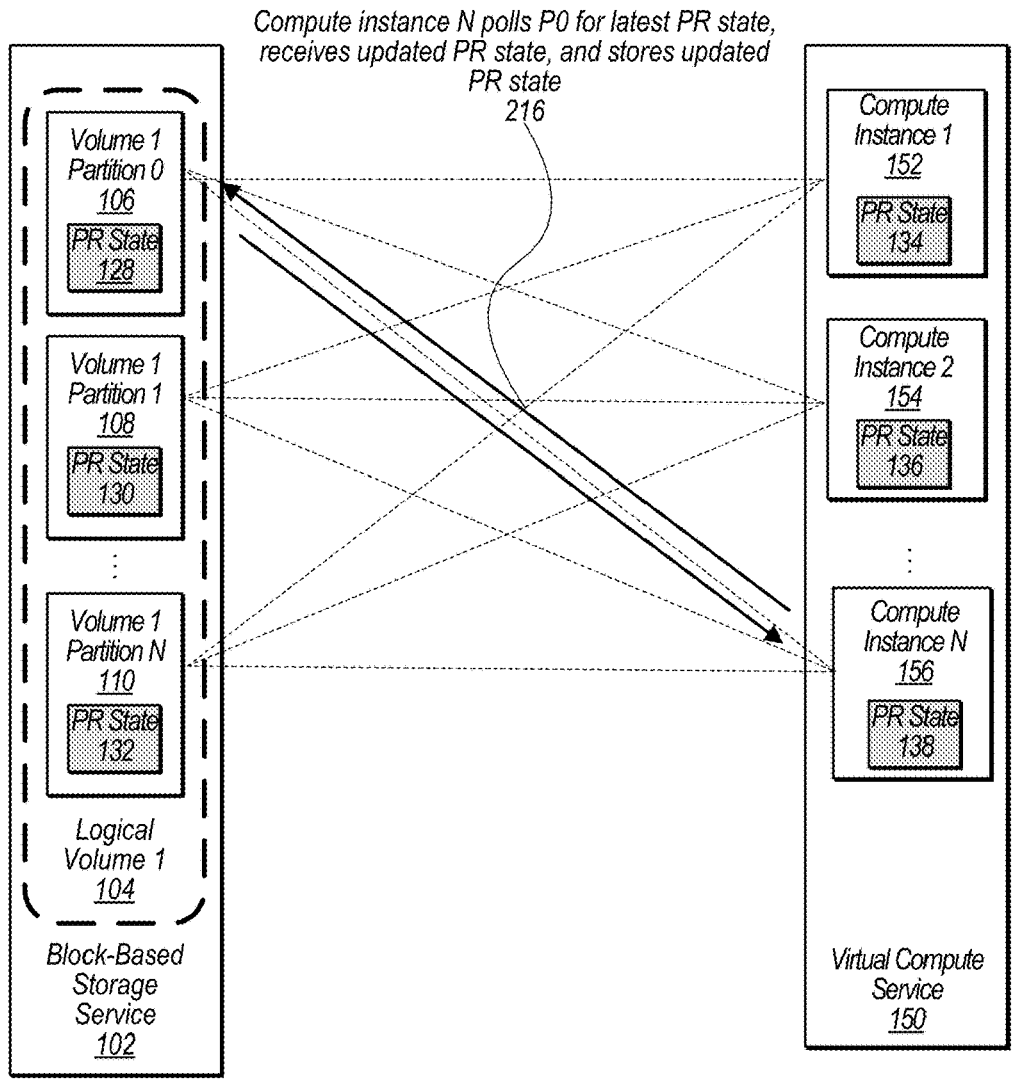
FIG. 2H illustrates the remaining compute instance attached to the logical volume of the block-based storage service that has not yet received the updated reservation state polling the designated partition and receiving the updated reservation state for the logical volume from the designated partition, according to some embodiments.
Figure 2H:
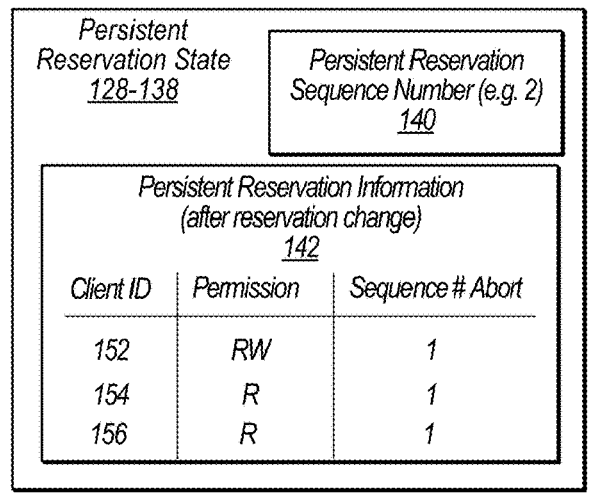

FIG. 2H illustrates the remaining compute instance attached to the logical volume of the block-based storage service that has not yet received the updated reservation state polling the designated partition and receiving the updated reservation state for the logical volume from the designated partition, according to some embodiments.

At a scheduled polling interval, compute instance 156 initiates poll 216 of partition P0 (106) and receives the updated PR state comprising PR information 142 and PR sequence number 2 (140). In response compute instance 156 stores updated PR state 138 which includes PR information 142 and PR sequence number 2 (140).

FIG. 3 is a block diagram illustrating a provider network 300 that includes multiple network-based services such as a block-based storage service 320 that enables multiple compute instances of a virtual compute service 340 to attach to a logical volume and that implements reservations for the logical volume, according to some embodiments. Provider network 300 may be set up by an entity such as a company or a public sector organization to provide one or more services (such as various types of cloud-based computing or storage) accessible via the Internet and/or other networks to customers 310. Provider network 300 may be a cloud provider network (sometimes referred to simply as a "cloud"), which refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block storage servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services, which may include a virtual compute service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

Customers 310 may access these various services offered by provider network 300 via network 370. Likewise network-based services may themselves communicate and/or make use of one another to provide different services. For example, computing resources offered to customers 310 in units called "instances," such as virtual or physical compute instances, may make use of logical volume comprising particular data volume partitions 326, which provide virtual block-based storage for the compute instances.

As noted above, virtual compute service 340 may offer various compute instances, such as compute instances 354a and 354b to customers 310. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 340 in different embodiments, including special purpose computer servers, storage devices, network devices and the like. In some embodiments instance customers 310 or any other user may be configured (and/or authorized) to direct network traffic to a compute instance. In various embodiments, compute instances may mount, connect, attach or map to one or more data volumes comprising data volume partitions 326 provided by block-based storage service 320 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing customer applications, without for example requiring the customer 310 to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc., and (in the case of reserved compute instances) reservation term length.

As illustrated in FIG. 3, a virtualization host, such as virtualization hosts 342a and 342n, may implement and/or manage multiple compute instances 352a, 352b, 354a, and 354b respectively, in some embodiments, and may be one or more computing devices, such as computing device 1000 described below with regard to FIG. 10. Virtualization hosts 342 may also provide multi-tenant hosting of compute instances. For example, in some embodiments, one virtualization host may host a compute instance for one entity (e.g., a particular customer or account of virtual computing service 310), while another compute instance hosted at the same virtualization host may be hosted for another entity (e.g., a different account). A virtualization host may include a virtualization management module, such as virtualization management modules 344a and 344b capable of instantiating and managing a number of different customer-accessible virtual machines or compute instances. The virtualization management module may include, for example, a hypervisor and an administrative instance of an operating system, which may be termed a "domain-zero" or "dom0" operating system in some implementations. The dom0 operating system may not be accessible by customers on whose behalf the compute instances run, but may instead be responsible for various administrative or control-plane operations of the network provider, including handling the network traffic directed to or from the compute instances.

Virtual computing service 340 may implement control plane 350 to perform various management operations. For instance, control plane 350 may implement resource management to place compute instances, and manage the access to, capacity of, mappings to, and other control or direction of compute instances offered by provider network. Control plane 350 may also offer and/or implement a flexible set of resource reservation, control and access interfaces for customers 310 via an interface (e.g., API). For example, control plane 350 may provide credentials or permissions to customers 310 such that compute instance control operations/interactions between customers and in-use computing resources may be performed.

In various embodiments, control plane 350 may track the consumption of various computing instances consumed for different virtual computer resources, customers, user accounts, and/or specific instances. In at least some embodiments, control plane 350 may implement various administrative actions to stop, heal, manage, or otherwise respond to various different scenarios in the fleet of virtualization hosts 342 and instances 352, 354. Control plane 350 may also provide access to various metric data for customer(s) 310 as well as manage customer configured alarms.

In various embodiments, provider network 300 may also implement block-based storage service 320 for performing storage operations. In some embodiments, block based storage service may be implemented using a fault-tolerant data-storage system, wherein each data volume partition 326 is stored using a primary head node, a secondary head node, and a set of storage sleds comprising mass storage devices that store volume partition data flushed from the head nodes to the mass storage devices. In some embodiments, the head nodes and data storage sleds of the fault-tolerant data storage system may be included in data storage units (e.g. data storage units 324).

Block-based storage service 320 is implemented using a fault-tolerant data storage system, composed of one or more computing devices implementing a zonal control plane 330 and a pool of multiple data storage units 324a, 324b through 324n, which provide block level storage for storing one or more sets of data volume partition(s) 326a, 326b through 326n. Data volume partitions 326 may be part of a logical volume that is attached, mounted, mapped, or otherwise connected to particular clients (e.g., a virtual compute instance of virtual compute service 340), providing virtual block-based storage (e.g., hard disk storage or other persistent storage) as a contiguous set of logical blocks. In some embodiments, a data volume may be divided up into multiple data chunks or partitions (e.g. data volume partitions 326) (including one or more data blocks). In some embodiments, some blocks or partitions may be used for performing other block storage operations, such as snapshot operations or replication operations. A volume snapshot of a data volume/data volume partition 326 may be a fixed point-in-time representation of the state of the data volume/data volume partition 326. In some embodiments, volume snapshots may be stored remotely from a data storage unit 324 maintaining a data volume, such as in another storage service 360. Snapshot operations may be performed to send, copy, and/or otherwise preserve the snapshot of a given data volume in another storage location, such as a remote snapshot data store in other storage service 360. In some embodiments, a block-based storage service, such as block-based storage service 320, may store snapshots of data volumes stored in the block-based storage service.

Block-based storage service 320 may implement zonal control plane 330 to assist in the operation of block-based storage service 320. In various embodiments, zonal control plane 330 assists in creating volumes/volume partitions on data storage units 324a, 324b, through 324n and moving volume partitions between data storage units 324a, 324b, through 324n. In some embodiments, access to data volume partitions 326 may be provided over an internal network within provider network 300 or externally via network 370, in response to block data transaction instructions.

Zonal control plane 330 may provide a variety of services related to providing block level storage functionality, including the management of user accounts (e.g., creation, deletion, billing, collection of payment, etc.). Zonal control plane 330 may implement capacity management, which may generate and manage a capacity model for storage service 320, and may direct the creation of new volumes on particular data storage units based on the capacity of storage service 320. Zonal control plane 330 may further provide services related to the creation and deletion of data volume partitions 326 in response to configuration requests.

Customers 310 may encompass any type of customer configured to submit requests to network provider 300. For example, a given customer 310 may include a suitable version of a web browser, or may include a plug-in module or other type of code module configured to execute as an extension to or within an execution environment provided by a web browser. Alternatively, a customer 310 may encompass an application such as a database application (or user interface thereof), a media application, an office application or any other application that may make use of compute instances, a data volume partition 326, or other network-based service in provider network 300 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, customers 310 may be configured to generate network-based services requests according to a Representational State Transfer (REST)-style network-based services architecture, a document- or message-based network-based services architecture, or another suitable network-based services architecture. In some embodiments, a customer 310 (e.g., a computational client) may be configured to provide access to a compute instance or data volume 326 in a manner that is transparent to applications implemented on the customer 310 utilizing computational resources provided by the compute instance or block storage provided by the data volume 326.

Customers 310 may convey network-based services requests to provider network 300 via external network 370. In various embodiments, external network 370 may encompass any suitable combination of networking hardware and protocols necessary to establish network-based communications between customers 310 and provider network 300. For example, a network 370 may generally encompass the various telecommunications networks and service providers that collectively implement the Internet. A network 370 may also include private networks such as local area networks (LANs) or wide area networks (WANs) as well as public or private wireless networks. For example, both a given customer 310 and provider network 300 may be respectively provisioned within enterprises having their own internal networks. In such an embodiment, a network 370 may include the hardware (e.g., modems, routers, switches, load balancers, proxy servers, etc.) and software (e.g., protocol stacks, accounting software, firewall/security software, etc.) necessary to establish a networking link between given customer 310 and the Internet as well as between the Internet and provider network 300. It is noted that in some embodiments, customers 310 may communicate with provider network 300 using a private network rather than the public Internet.

In some implementations, at least a subset of virtualization management tasks may be performed at one or more offload cards so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like.

Figure 4:
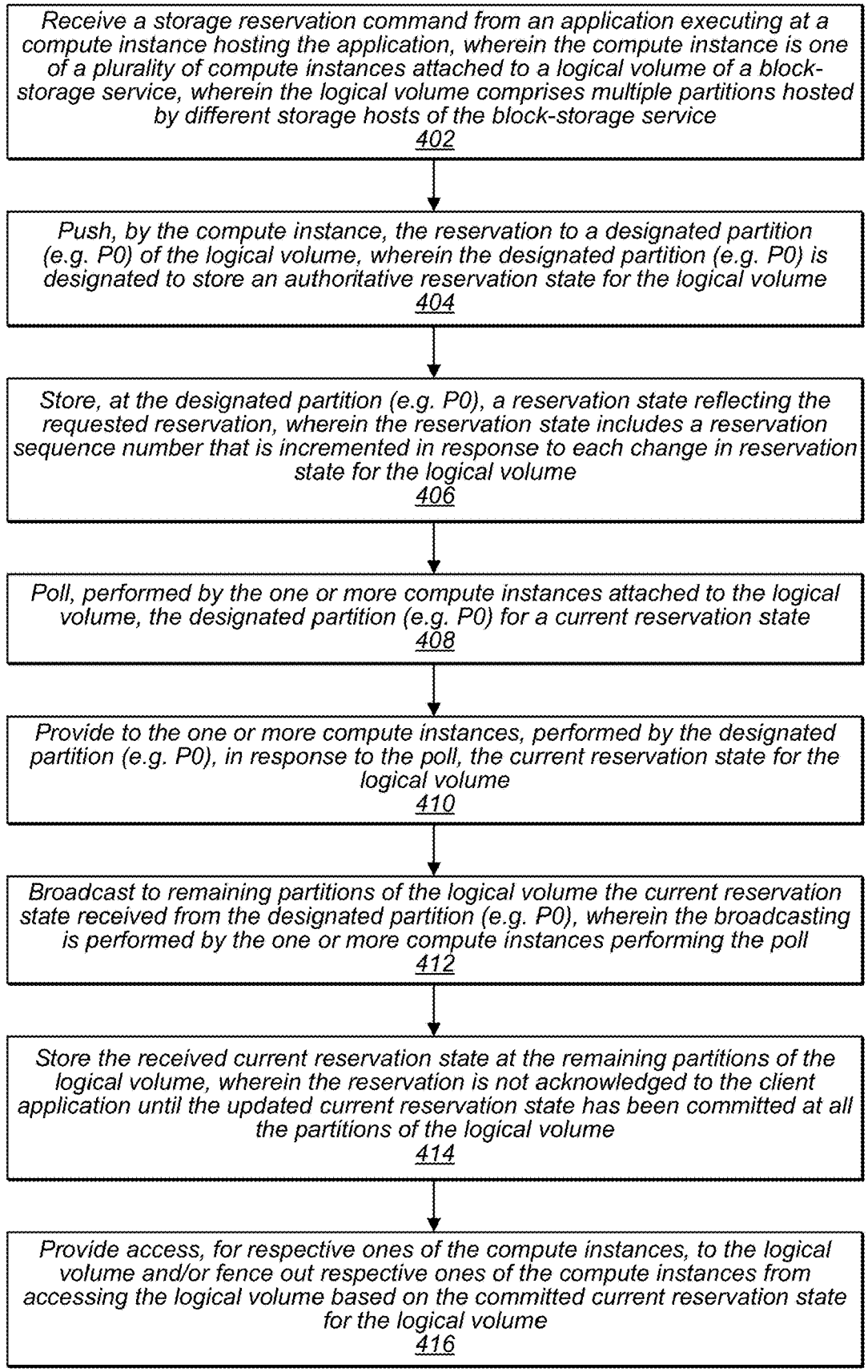
FIG. 4 is a block diagram illustrating operations performed by computing devices of a block-based storage service and compute resources of a virtual compute service to distribute a reservation state or an updated reservation state for a logical volume of the block-based storage service, according to some embodiments.

FIG. 4 is a block diagram illustrating operations performed by computing devices of a block-based storage service and compute resources of a virtual compute service to distribute a reservation state or an updated reservation state for a logical volume of the block-based storage service, according to some embodiments.

At block 402, a compute instance connected to a logical volume of a block-storage service that supports multi-attach volumes receives a storage reservation command from an application executing at the compute instance hosting the application, wherein the compute instance is one of a plurality of compute instances attached to the logical volume of the block-storage service, and wherein the logical volume comprises multiple partitions hosted by different storage hosts of the block-storage service.

At block 404, the compute instance pushes a reservation update request to a designated partition (e.g. P0) of the logical volume, wherein the designated partition (e.g. P0) is designated to store an authoritative reservation state for the logical volume.

At block 406, the data storage unit hosting the designated partition stores an updated reservation state reflecting the requested reservation update/change. The updated reservation state includes a reservation sequence number that is incremented from the previous reservation sequence number of the previous reservation state stored by the designated partition.

At block 408, another one of the compute instances attached to the logical volume polls the designated partition (e.g. P0) for a current reservation state. Note that alternatively the compute instance that sent the reservation update request to the designated partition P0 may receive an acknowledgement that the reservation state has been changed. At block 410 the designated partition P0 provides the current reservation state to the remaining partitions either in response to a poll or in response to an acknowledgment that a reservation state has been changed.

A computing instance receiving the updated reservation state with a sequence number greater than its stored sequence number, at block 412, broadcasts the updated reservation state to the remaining partitions of the logical volume (e.g. the partitions other than the designated partition that provided the indication that a new reservation state had been stored for the logical volume).

At block 414, the data storage hosts hosting the remaining partitions that receive the broadcast of the current reservation state store the current reservation state. Note the reservation change is not communicated to the client application requesting the reservation change as being committed for the logical volume until all partitions have stored the updated reservation state.

At block 416, the data storage hosts hosting the partitions of the logical volume provide access to the compute instances attached to the logical volume and/or fence out the compute instances attached to the logical volume from having certain types of access to the logical volume based on the committed current reservation state for the logical volume.

Figure 5:
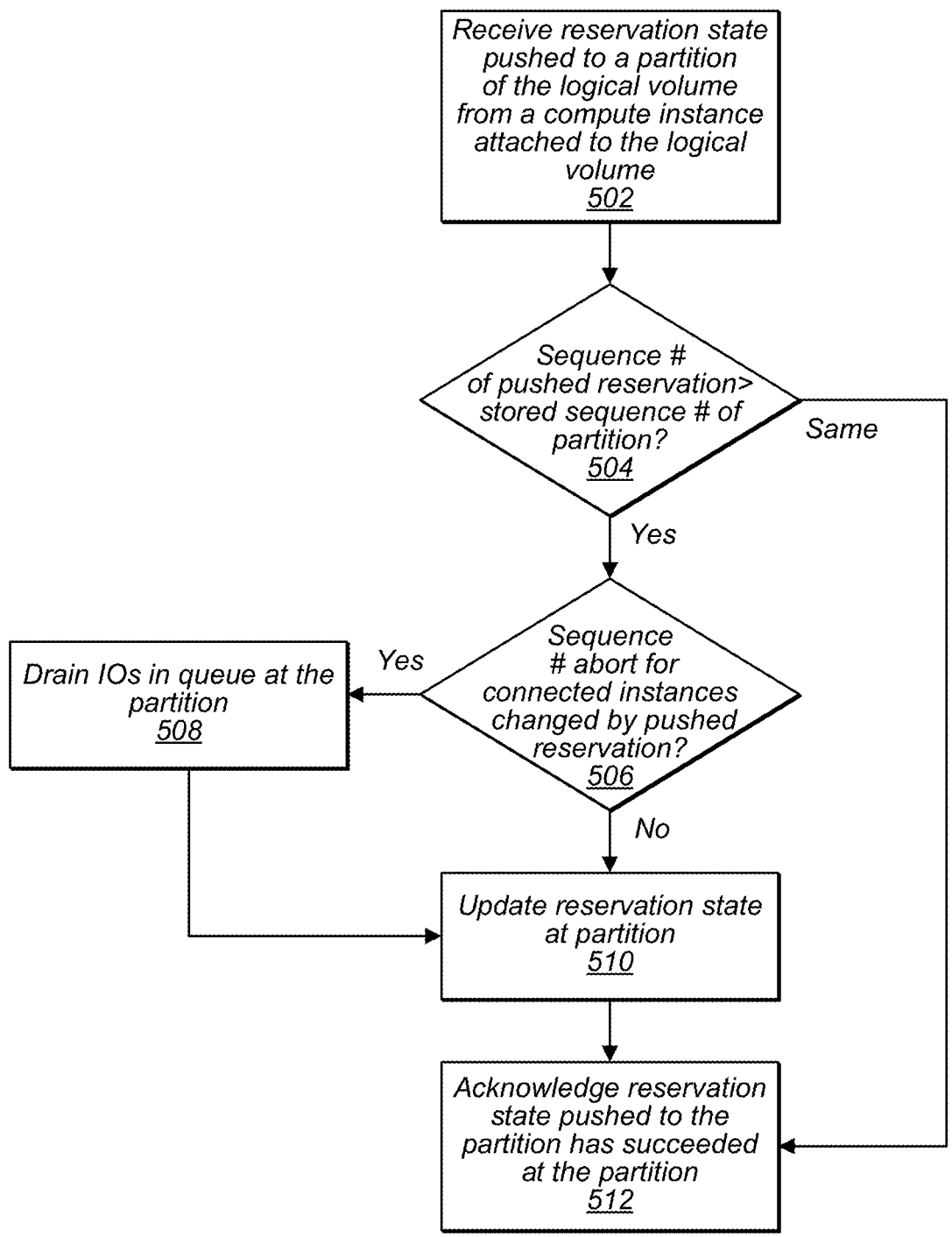
FIG. 5 is a block diagram illustrating a reservation state update process performed by a computing device of a block-based storage service that is hosting a partition of a logical volume, according to some embodiments.

FIG. 5 is a block diagram illustrating a reservation state update process performed by a computing device of a block-based storage service that is hosting a partition of a logical volume, according to some embodiments.

At block 502, a server, for example of a data storage unit, hosting a partition of a logical volume receives a reservation state update that has been pushed to the partition that the server hosts, wherein the reservations state update is pushed by a computing instance attached to the logical volume.

At block 504, the server hosting the partition determines if a reservation sequence number included with the pushed reservation state is greater than a sequence number of a reservation state for the logical volume that is already stored for the partition hosted by the server. If the pushed reservation state has a greater sequence number than the reservations state stored for the partition, then the server proceeds to block 506, if the sequence numbers are the same, the server proceeds to block 512 and acknowledges the reservation state pushed to the partition has succeeded at the partition.

At block 506, the server hosting the data partition determines if a sequence number abort for any of the connected compute instances is changed as a result of the pushed reservation. If so, at block 508, the server drains any in-flight or queued IOs for the partition before acknowledging the pushed reservation state has been stored.

At block 510, the server hosting the data partition updates the reservation state for the partition based on the pushed reservation state. Also, at block 512, the server hosting the data partition acknowledges the reservation state pushed to the partition has succeeded at the partition.

Figure 6:
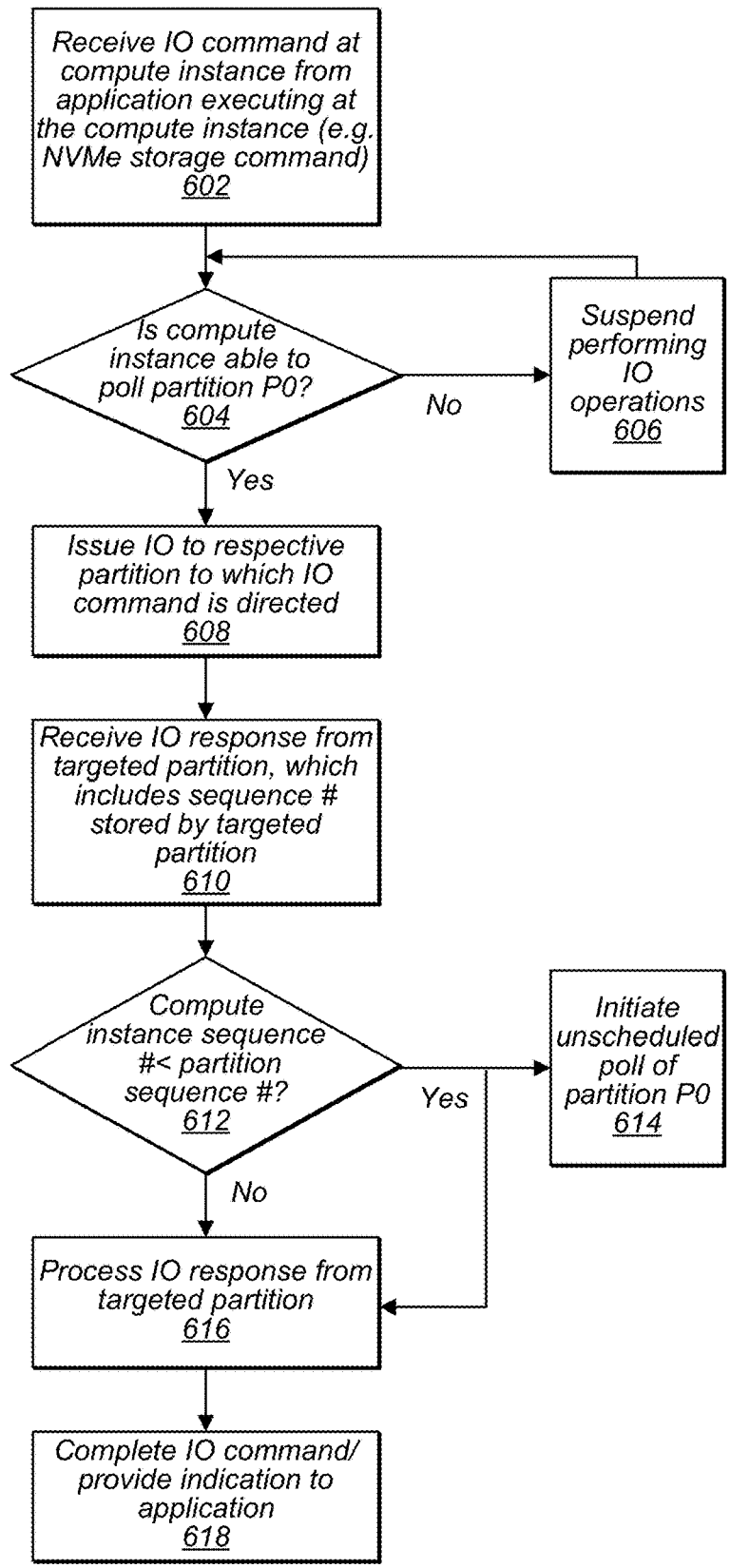
FIG. 6 is a block diagram illustrating read and write request processing performed by a compute instance attached to a logical volume of a block-based storage service that implements persistent reservations, according to some embodiments.

FIG. 6 is a block diagram illustrating read and write request processing performed by a compute instance attached to a logical volume of a block-based storage service that implements persistent reservations, according to some embodiments.

At block 602, a compute instance attached to a multi-attach logical volume of a block-storage service supporting storage reservations receives an IO command from an application executing at the compute instance.

At block 604, the compute instance determines whether or not it is able to poll partition P0 (or it has recently established that it can poll P0 at a previous scheduled polling interval). If unable to poll P0, at 606 the compute instance suspends performing IO operations for the logical volume until it is able to poll P0. Note that P0 may be implemented using a primary head node (e.g. primary server) and a secondary head node (e.g. secondary server), such that if a poll fails due to a failure of the primary head node, polling will be able to be continued once the secondary head node assumes the role of primary head node.

If the compute instance is able to poll P0 for the logical volume, then at block 608, the compute instance issues an IO to a targeted partition, wherein the IO includes a current reservation sequence number stored by the compute instance.

At block 610, the compute instance receives an acknowledgment back from the targeted partition, wherein the acknowledgment includes a current reservation sequence number stored by the targeted partition.

At block 612, the compute instance determines if the received reservation sequence number is greater than its stored reservation sequence number. If so, at block 614, the compute instance initiates a poll of partition P0 for the attached logical volume.

At 616, the compute instance then processes the IO response from the targeted partition. At block 618 the compute instance acknowledges to the requesting application that the IO command has been committed or denied.

Figure 7:
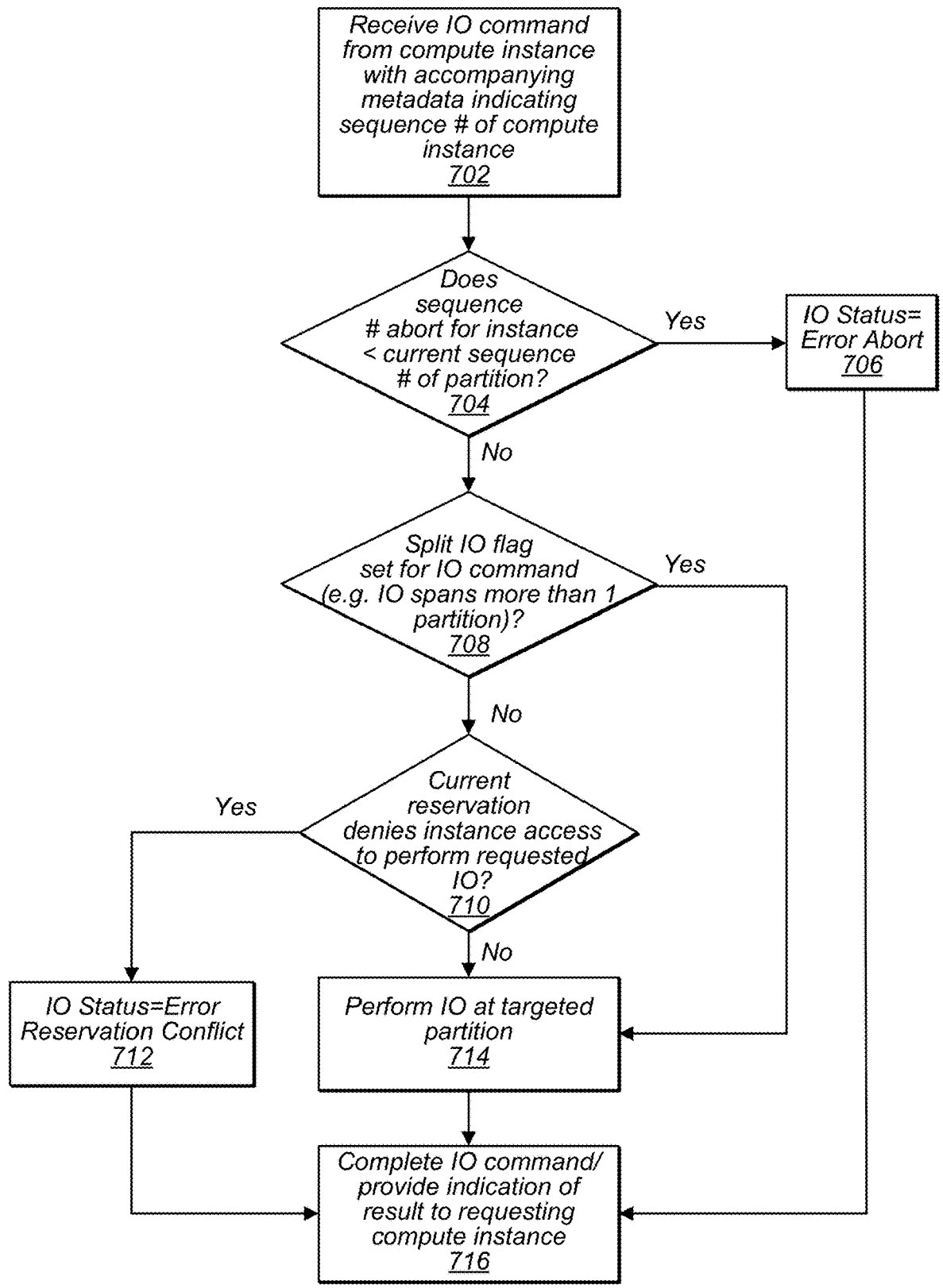
FIG. 7 is a block diagram illustrating read and write request processing performed by a computing device of a block-storage service, wherein the computing device hosts a partition of a logical volume of the block-based storage service for which persistent reservations have been implemented, according to some embodiments.

FIG. 7 is a block diagram illustrating read and write request processing performed by a computing device of a block-storage service, wherein the computing device hosts a partition of a logical volume of the block-based storage service for which persistent reservations have been implemented, according to some embodiments.

At block 702, a server of a data storage unit (e.g. a head node of the data storage unit) receives an IO command from a compute instance with accompanying metadata indicating a reservation sequence stored by the compute instance.

At block 704, the server determines whether a sequence number abort for the compute instance is less than the current reservation sequence number stored by the server for the partition. If so, at 706, the server issues an IO status=Error abort. If not, at block 708, the server determines whether a split IO flag is set for the IO command. If not, at block 710 the server determines whether or not the current reservation state stored for the partition grants the compute instance authority to perform the IO command. If access is denied, at 712, the server issues an IO status=Error reservation conflict.

At block 714, if the IO command is not aborted, is authorized per the current reservation state, or has a split IO flag set, the server performs the IO at the targeted partition.

At block 716, the server hosting the targeted partition completes the IO command and provides an indication to the requesting compute instance of a status of the IO command, e.g. error abort, error reservation conflict, or committed.

Figure 8:
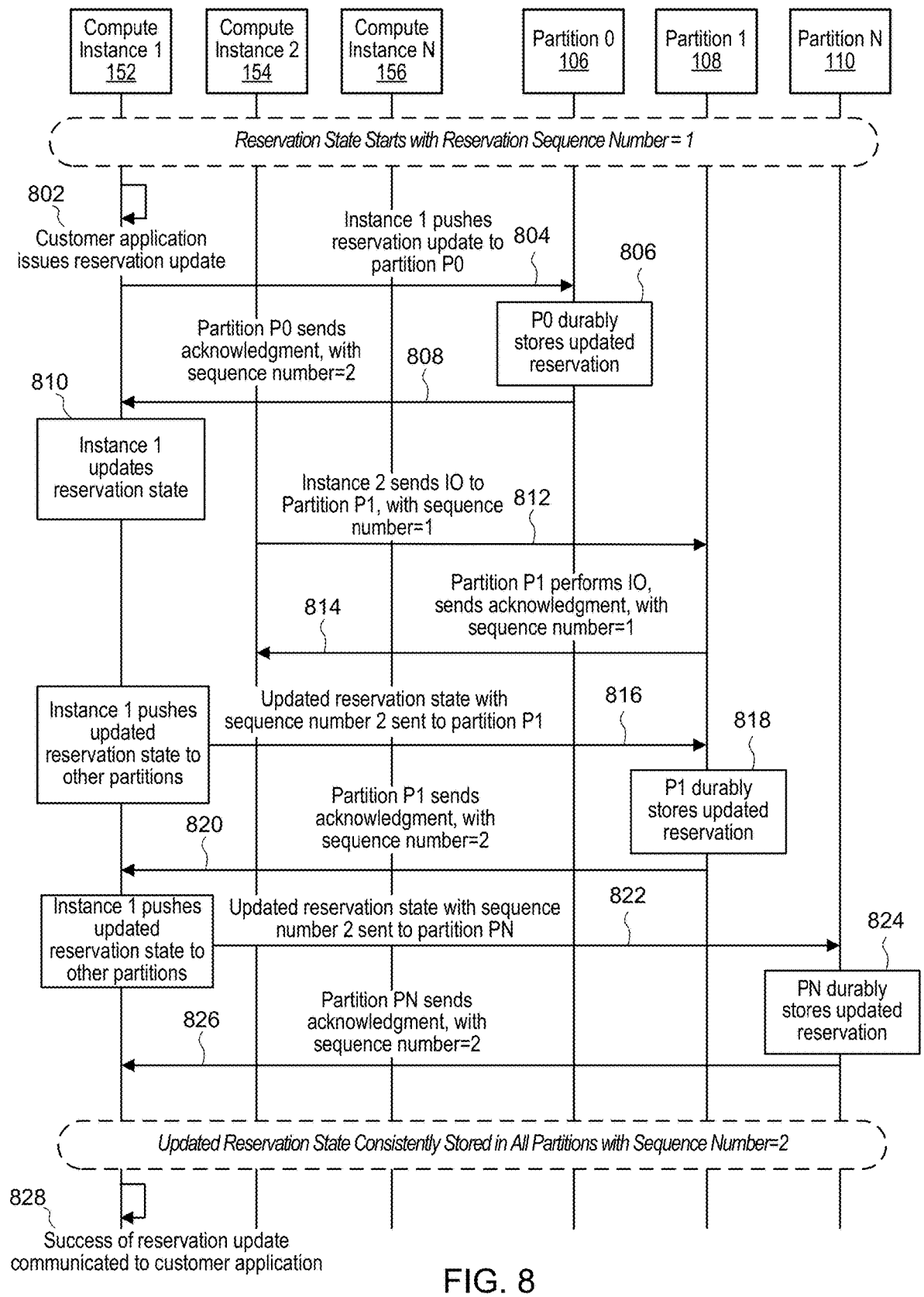
FIG. 8 illustrates interactions between compute instances and computing devices of a block-based storage service that are hosting partitions of a logical volume of the block-based storage service, wherein the compute instances are attached to the logical volume and wherein a reservation has been implemented for the logical volume, according to some embodiments.

FIG. 8 illustrates interactions between compute instances and computing devices of a block-based storage service that are hosting partitions of a logical volume of the block-based storage service, wherein the compute instances are attached to the logical volume and wherein a reservation has been implemented for the logical volume, according to some embodiments.

At 802 a customer application issues a reservation update to compute instance 1 (152). At 804, compute instance 1 (152) pushes the reservation update to partition P0 (106). At 806 partition P0 (106) durably stores the updated reservation and at 808 sends an acknowledgement back to compute instance 1 (152) with an incremented sequence number (e.g. reservation sequence number=2).

At 810 compute instance 1 (152) updates its stored reservation state.

At 812, compute instance 2 (154) (which has not yet received the updated reservation) sends an IO to partition P1 (108) (which has not yet received the updated reservation). At 814 partition P1 (108) sends an acknowledgment that the IO has been performed or denied based on the reservation state currently stored by partition P1 (108), e.g. a reservation state with reservation sequence number 1.

At 816, compute instance 1 (152) pushes the updated reservation state to the remaining partition P1 (108), at 818 partition P1 (108) durably stores the updated reservation because the updated reservation has a sequence number greater than the sequence number of the reservation state currently stored by partition P1 (108), and at 820 partition P1 (108) sends an acknowledgment back to compute instance 1 (152) that the updated reservation state has been stored by partition P1 (108).

Likewise, at 822 compute instance 1 (152) pushes the updated reservation to partition PN (110), at 824 partition PN (110) durably stores the updated reservation, and at 826 sends an acknowledgment back to compute instance 1 (152). At this point all partitions have durably stored the updated reservation. Thus, at 828 compute instance 1 (152) sends an acknowledgment to the requesting application that the updated reservation state has been committed for the logical volume.

Figure 9A:
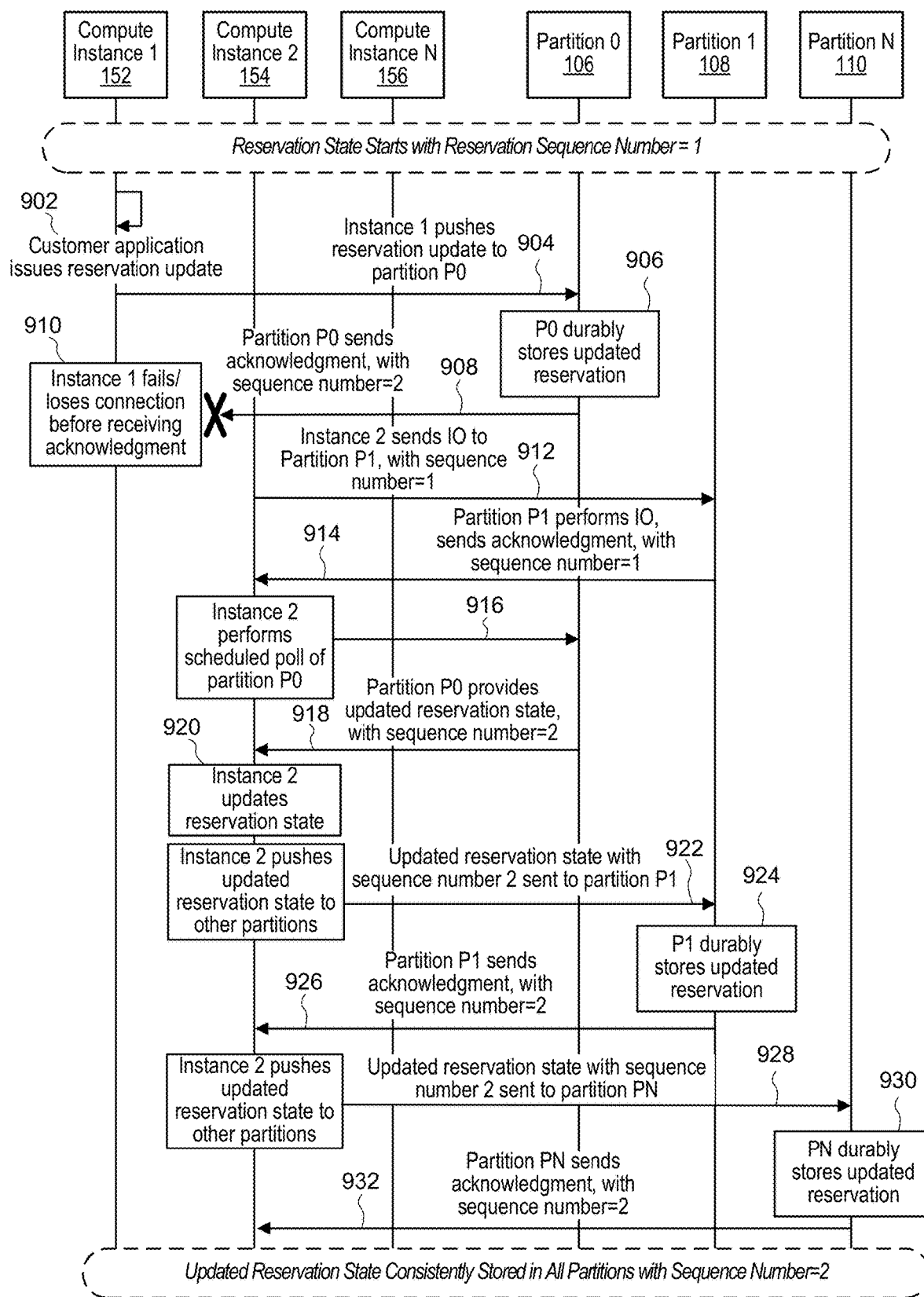
FIGS. 9A-9B illustrate additional interactions between compute instances and computing devices of a block-based storage service hosting partitions of a logical volume, wherein the compute instances are attached to the logical volume and wherein a persistent reservation has been implemented for the logical volume, according to some embodiments.
Figure 9B:
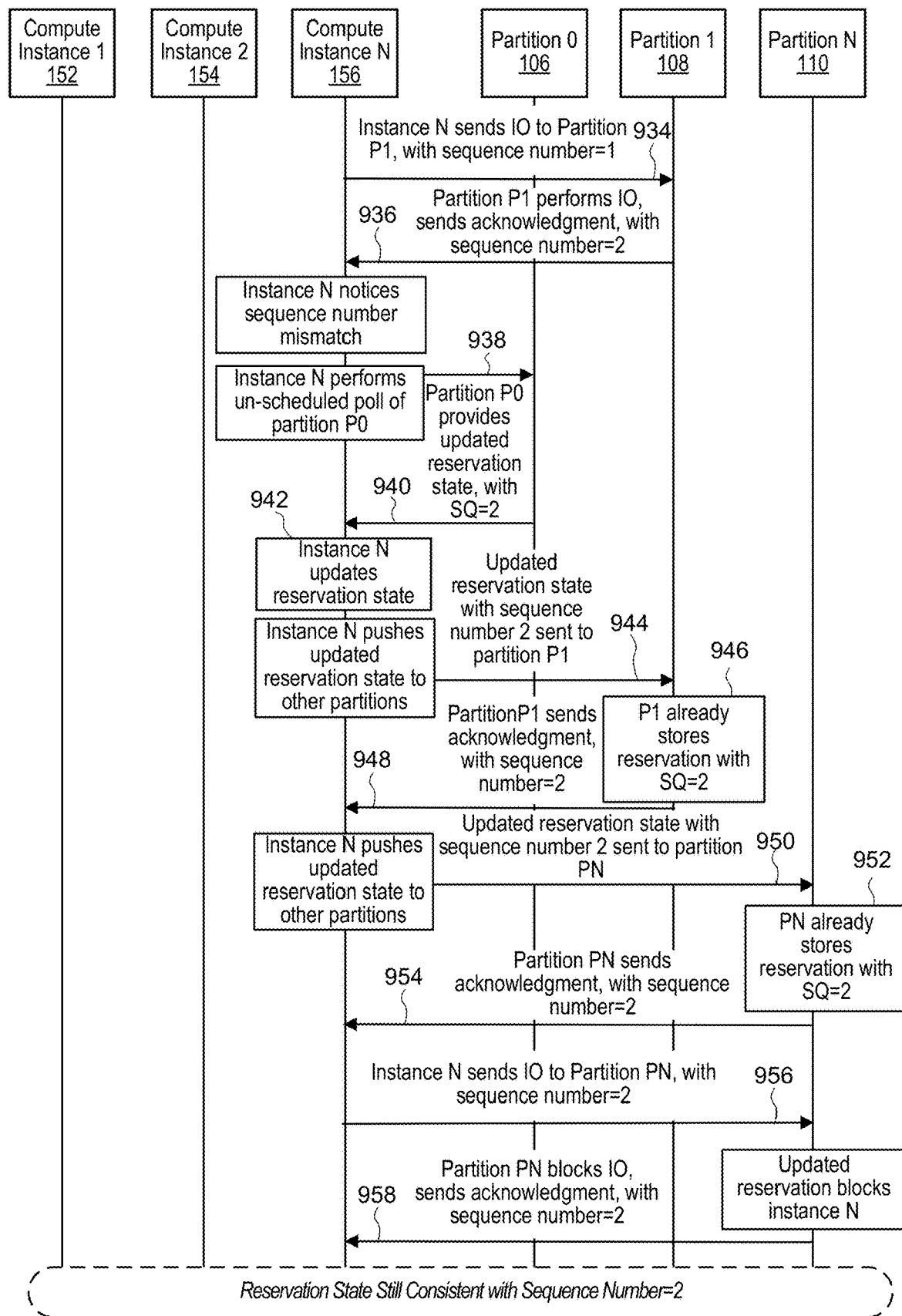

FIGS. 9A-9B illustrate additional interactions between compute instances and computing devices of a block-based storage service hosting partitions of a logical volume, wherein the compute instances are attached to the logical volume and wherein a persistent reservation has been implemented for the logical volume, according to some embodiments.

At 902 compute instance 1 (152) receives a customer application request for an updated reservation state and at 904 sends a reservation update request to partition P0 (106), which durably stores the updated reservation at 906 and sends an acknowledgment at 908. However, at 910 compute instance 1 (152) fails, falls offline, disconnects, or otherwise fails to receive the acknowledgment sent at 908. Thus, compute instance 1 (152) fails to broadcast the updated reservation state to the remaining partitions P1 (108) and PN (110).

At 912, compute instance 2 (154) sends an IO request to partition P1 (108) with sequence number 1. The request is performed or denied based on the reservation state currently stored by partition P1 (108) which has not yet received the updated reservation. Partition P1 (108) issues an acknowledgment back to compute instance 2 (154) at 914, wherein the acknowledgement includes reservation sequence number 1.

At 916 compute instance 2 (154) then performs a scheduled poll of partition P0 (106) and at 918 receives a poll response that includes the updated reservation state comprising reservation sequence number 2. At 920, compute instance 2 (154) updates its stored reservation state and at 922 pushes the updated reservation state to partition P1 (108), which durably stores the updated reservation at 924 and sends acknowledgment at 926. Also, at 928 compute instance 2 (154) pushes the updated reservation state to partition PN (110), which durably stores the updated reservation state at 930, and sends an acknowledgment at 932.

At this point, all of the partitions of the logical volume have transitioned to the updated reservation state. However, because the application running on compute instance 1 (152) requested the change in reservation and compute instance 1 (152) is offline, the commitment of the updated reservation state for the logical volume may not be immediately communicated to the requesting application.

At 934 compute instance N (156) (which has not yet received the updated reservation state) sends an IO to partition P1 (108) with sequence number 1. In response, the data storage unit hosting partition P1 grants or denies the IO based on the updated reservation state corresponding to reservation sequence number 2 and provides an acknowledgment at 936 comprising metadata indicating sequence number 2.

At 938 compute instance N (156) notices that the sequence number included in the reply from partition P1 (108) is greater than its stored sequence number and initiates a poll of partition P0 (106), which provides the updated reservation state at 940.

At 942, compute instance N (156) updates its stored reservation state and at 944 compute instance N (156) pushes the updated reservation state to partition P1 (108). At 946 the data storage unit hosting partition P1 (108) determines that it already stores a reservation state with sequence number 2 and at 948 acknowledges that it has stored the reservation state with sequence number 2.

At 950, compute instance N (156) also pushes the updated reservation state to partition PN (110). At 952 the data storage unit hosting partition PN (110) determines that it already stores a reservation state with sequence number 2 and at 954 acknowledges that it has stored the reservation state with sequence number 2.

As a further example, at 956 compute instance N (156) sends an TO request to partition PN (110) and the request is blocked according to the updated reservation. At 958 partition PN (110) sends a response to compute instance 156 indicating that the TO was blocked, wherein the response includes current sequence number 2 stored by partition PN (110).

Example Computer System

Figure 10:
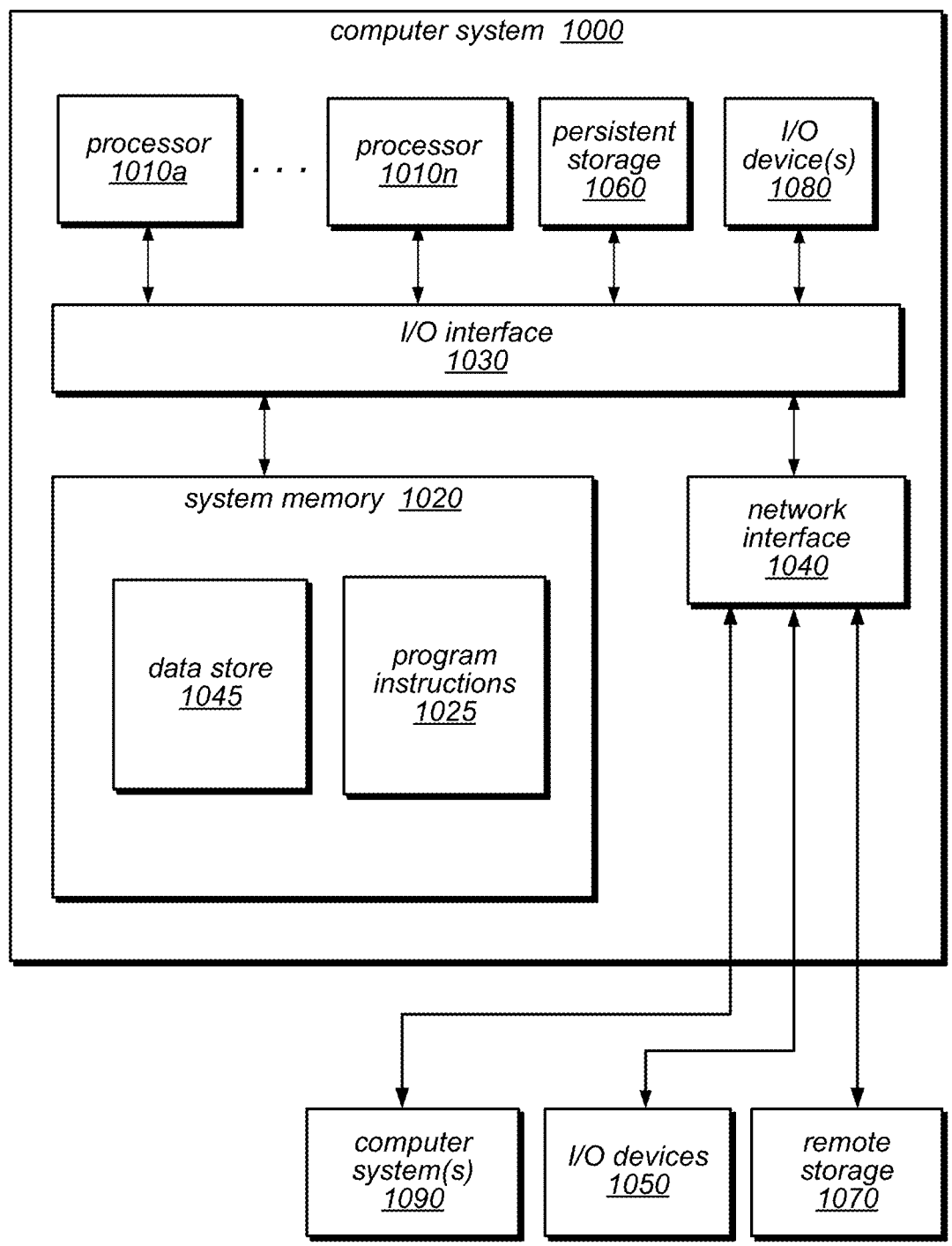
FIG. 10 is a block diagram illustrating an example computing system, according to some embodiments.

FIG. 10 is a block diagram illustrating an example computer system, according to various embodiments. For example, computer system 1000 may be configured to implement storage and/or head nodes of a data storage unit, storage and/or a sled controller of a data storage sled, other data stores, and/or a client, in different embodiments. Compute system 1000 may also be used to implement virtualization hosts of a virtual compute service, and/or other components of a block-based storage service, a virtual compute service, or other network-based services of a provider network, according to some embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage unit head node, and persistent storage 1060 may include the SSDs that include storage allocated to that head node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a storage node, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1345 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Ethernet, Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to customers as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    a computing service comprising a first plurality of computing devices configured to allocate compute instances to customers of the computing service; and
    a block-storage service comprising a second plurality of computing devices configured to host logical volumes of the block-storage service,
    wherein the block-storage service is configured to enable a given logical volume to accept connections from one or more of the compute instances of the computing service, and wherein the given logical volume comprises one or more volume partitions hosted by respective ones of the second plurality of computing devices of the block-storage service;
    wherein the second plurality of computing devices of the block storage service are further configured to:
        store a reservation state defining permissions for respective ones of the compute instances connected to the partitions of the given logical volume, wherein the reservation state includes a reservation sequence number that is incremented in response to a change in the reservation state, wherein a designated one of the plurality of partitions of the given logical volume maintains an authoritative copy of the reservation state for the given logical volume;
        receive, at a computing device of the block storage service hosting the designated partition, one or more poll requests, from one or more of the compute instances connected to the given logical volume, wherein the one or more poll requests request a current reservation state for the given logical volume;
        provide, by the computing device hosting the designated partition, to the one or more compute instances issuing the one or more poll requests, a current reservation state for the given logical volume comprising a current reservation sequence number for the given logical volume; and
        receive the current reservation state comprising the current reservation sequence number at other ones of the partitions of the logical volume that are hosted by other ones of the computing devices of the block-storage service, wherein the current reservation states received at the other ones of the partitions are received from the one or more compute instances that received the current reservation state from the designated partition as part of performing a poll.

2. The system of claim 1, wherein the block-storage service is further configured to:
    perform reads or writes requested by the plurality of compute instances connected to the given logical volume according to the permissions defined for the current reservation state of the given logical volume, wherein read or write access to respective ones of the volume partitions is granted or denied to respective ones of the compute instances based on the permissions of the current reservation state.

3. The system of claim 1, wherein the respective ones of the compute instances connected to the given logical volume are configured to:
in response to receiving a reservation state from the designated partition that comprises a reservation sequence number greater than a reservation sequence number currently stored by the respective compute instance:
send reservation state updates to other ones of the partitions of the logical volume other than the designated partition.

4. The system of claim 1, wherein the respective ones of the compute instances connected to the given logical volume are configured to:
perform the poll of the designated partition according to a polling schedule; and
send reservation state updates to other ones of the partitions of the logical volume other than the designated partition in response to the poll indicating a greater reservation sequence number than a reservation sequence number currently stored by the respective compute instance.

5. The system of claim 1, wherein the respective ones of compute instances connected to the given logical volume are configured to:
receive, in response to issuing a read or write request to the logical volume, a response indicating whether the requested read or write was performed, wherein the response also comprises a current reservation sequence number of a partition of the given logical volume to which the requested read or write was directed; and
in response to receiving a reservation sequence number in the response that is greater than a reservation sequence number currently stored by the respective compute instance:
send a poll request to the designated partition; and
in response to receiving a current reservation state from the designated partition comprising a current reservation sequence number that is greater than the reservation sequence number currently stored by the respective compute instance:
send reservation state updates comprising the current reservation state and current reservation sequence number received from the designated partition to other ones of the partitions of the logical volume.

6. The system of claim 1, wherein the current reservation state for the given logical volume stored in the designated partition comprises:
the current reservation sequence number corresponding to the current reservation state for the reservation;
respective IDs and associated access permissions for each of the compute instances connected to the given logical volume according to the current reservation state corresponding to the current reservation sequence number; and
a sequence number abort status for each of the compute instances connected to the given logical volume, wherein if a sequence number abort is set for a given compute instance a read or write request from the given compute instance will be rejected by a receiving partition of the given logical volume if a current reservation sequence number stored by the receiving partition is greater than the sequence number abort for the given compute instance.

7. A method, comprising:
receiving a request to establish or modify a reservation defining permissions for respective ones of a plurality of clients connected to a plurality of servers;
storing the reservation in a designated one of the servers, wherein the designated server maintains an authoritative reservation state that includes a sequence number corresponding to a current reservation state, wherein the sequence number is incremented in response to a change in reservation state;
providing, by the designated server, to one or more of the clients, a current reservation state comprising a current sequence number using an existing connection between the designated server and the one or more clients;
sending, by the one or more clients, the current reservation state received from the designated server, to other ones of the servers using existing connections between the one or more clients and the other ones of the servers; and
updating respective reservation states of the other ones of the servers based on the current reservation state sent from the one or more clients.

8. The method of claim 7, wherein:
the designated server provides the current state comprising the current sequence number to a given one of the clients that submitted the request; and
the given one of the clients that submitted the request:
receives the current state comprising the current sequence number from the designated server; and
sends the current state comprising the current sequence number to the other ones of the servers.

9. The method of claim 7, wherein:
the designated server provides the current state comprising the current sequence number to a given one of the clients that submitted the request; and
the given one of the clients that submitted the request becomes unavailable prior to receiving the current state from the designated server;
wherein the method further comprises:
continuing to grant or deny read or write requests according a reservation state, in place prior to the request, at servers that have not received the current reservation state resulting from the request to establish or modify the reservation;
polling, performed by another given client other than the client that has become unavailable, the designated server for a current reservation state;
receiving, at the other given client, the current reservation state comprising the sequence number that has been incremented due to the request;
sending, performed by the other given client, the current reservation state that comprises the current sequence number that has been incremented due to the request to the other ones of the servers other than the designated server; and
providing, in response to the current reservation state being committed in each of the servers, an acknowledgment to a client application of the client that made the request, wherein the acknowledgment indicates the request to establish or modify the reservation has been committed for a distributed object stored by the servers.

10. The method of claim 7, wherein:
the designated server provides the current reservation state comprising the current sequence number to a given one of the clients that submitted the request; and
the given one of the clients that submitted the request sends the current reservation state comprising the current sequence number incremented due to the request to the other ones of servers other than the designated server;

wherein the method further comprises:
sending, by another one of the clients that has not yet received the current reservation state comprising the current sequence number that has been incremented due to the request, a read or write request to one of the other ones of the servers that has received the current sequence number that has been incremented due to the request or to the designated server, wherein the read or write request is sent with metadata indicating a sequence number stored by the other one of the clients that has now been superseded; and accepting or rejecting the read or write request at the one of the servers or the designated server based on permissions associated with the current reservation state corresponding to the current sequence number that has been incremented due to the request.

11. The method of claim 10, wherein if a sequence number abort less than the current sequence number is set in the reservation state for the other client sending the read or write request, the other one of the given servers or the designated server aborts the read or write request.

12. The method of claim 7, further comprising:
receiving, by one of the clients, a response to a read or write request that comprises a sequence number greater than a sequence number stored by the client; and
initiating a poll of the designated server in response to receiving the response indicating the sequence number greater than the sequence number stored by the client, wherein the poll is initiated prior to a next scheduled poll for the client.

13. The method of claim 7, further comprising:
attempting, by one of the clients, to poll the designated server for a current reservation state; and
refraining, in response to not being able to poll the designated server, from sending read or write requests to a distributed object hosted by the servers until being able to successfully poll the designated server.

14. The method of claim 13, wherein the designated server is implemented using a primary node and a secondary node, the method further comprising:
in response to a failure of the primary node for the designated server, assuming by the secondary node a role of primary node for the designated server; and
re-attempting, by the client, to poll the designated server for the current reservation state, wherein the poll is routed to the former secondary node that has now assumed the role of primary node;
receiving, by the client, a response to the poll from the former secondary node that has now assumed the role of primary node; and
resuming sending read or write requests.

15. The method of claim 7, wherein the servers host a distributed object, the further comprising:
generating, for each write request directed to the distributed object received from the clients, a monotonically increasing write number;
storing, by the servers, a threshold number of most recent writes and associated write numbers in respective ring buffers of the servers;
subsequent to a disconnection between a given server and a given client and a following re-connection between the given server and the given client:
verifying, performed by the given server, whether a write received from the given client subsequent to the reconnection is a write being replayed by the given client that was already committed by the server; and
responding to the given client based on a status of the write as indicated in the ring buffer of the given server, even if a reservation state for the given client has changed during a time the given client and the given server were disconnected such that a current reservation state would result in the given server denying the write request from the given client.

16. The method of claim 7, further comprising:
sending, by one of the clients connected to a distributed storage object hosted by the servers, a read or write request that spans two or more partitions of the distributed storage object hosted by the servers, wherein a split IO flag is set for the read or write request; and
performing, by two or more of the servers, the read or write if the reservation state corresponding to the current sequence number grants the client access to perform the read or write for at least one of the two or more partitions of the distributed storage object.

17. The method of claim 16, wherein the client sending the read or write request that spans the two or more partitions first sends the read or write request without the split IO flag set and receives conflicting responses from the two or more servers, and in response re-sends the read or write request with the spit IO flag set.

18. One or more non-transitory, computer-readable media storing program instructions, that when executed on or across one or more processors, cause the one or more processors to:
receive a request to store a reservation defining permissions for respective ones of a plurality of clients connected to a distributed storage object;
cause the reservation to be stored in a designated one of a plurality of servers hosting the distributed storage object, wherein the designated server maintains an authoritative reservation state for the distributed storage object;
provide, by the designated server, a current sequence number for a current reservation state of the distributed storage object to one or more clients;
receive the current reservation state comprising the current sequence number provided by the designated server, from the one or more clients, at other ones of the servers hosting the distributed storage object; and
update the reservation states of the other ones of the servers based on the current reservation state received from the clients connected to the distributed storage object.

19. The one or more non-transitory, computer-readable media of claim 18, wherein:
the authoritative reservation state maintained by the designated server includes a sequence number corresponding to a current reservation state for the distributed storage object; and
the sequence number of the authoritative reservation state is incremented in response to a change in the reservation state for the distributed storage object.

20. The one or more non-transitory, computer-readable media of claim 18, wherein the request to store the reservation is sent to the distributed storage object in response to a client application of one of the clients attached to the distributed storage object receiving a reservation request formatted in accordance with a non-volatile memory express (NVMe) standard or a small computer system interface (SCSI) standard for storage reservations.

\* \* \* \* \*